(12) United States Patent
Suzuki et al.

(10) Patent No.: US 9,156,162 B2
(45) Date of Patent: Oct. 13, 2015

(54) INFORMATION PROCESSING APPARATUS AND INFORMATION PROCESSING METHOD

(71) Applicant: CANON KABUSHIKI KAISHA, Tokyo (JP)

(72) Inventors: Masahiro Suzuki, Kawasaki (JP); Kazuhiko Kobayashi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 105 days.

(21) Appl. No.: 13/781,644

(22) Filed: Feb. 28, 2013

(65) Prior Publication Data

US 2013/0238124 A1    Sep. 12, 2013

(30) Foreign Application Priority Data

Mar. 9, 2012   (JP) .................................. 2012-053687

(51) Int. Cl.
*G05B 19/18*    (2006.01)
*G05B 15/00*    (2006.01)
*B25J 9/16*    (2006.01)

(52) U.S. Cl.
CPC *B25J 9/16* (2013.01); *B25J 9/1697* (2013.01); *G05B 2219/39484* (2013.01); *G05B 2219/40053* (2013.01); *Y10S 901/31* (2013.01)

(58) Field of Classification Search
USPC ............. 382/190, 198, 291; 348/511; 700/62, 700/250, 245, 258, 259, 262, 254; 74/490.05; 901/16, 26, 28, 31, 14, 30, 901/46, 47; 294/88, 907, 106, 111
See application file for complete search history.

(56) References Cited

U.S. PATENT DOCUMENTS

| 4,402,053 A | 8/1983 | Kelley et al. |
| 4,412,293 A | 10/1983 | Kelley et al. |
| 4,639,878 A | 1/1987 | Day et al. |
| 4,680,802 A | 7/1987 | Nishida et al. |
| 4,831,549 A | 5/1989 | Red et al. |

(Continued)

FOREIGN PATENT DOCUMENTS

| CN | 1980775 A | 6/2007 |
| EP | 0389259 A2 | 9/1990 |

(Continued)

OTHER PUBLICATIONS

U.S. Appl. No. 13/865,917, filed Apr. 18, 2013 Applicant: Yasuo Katano, et al.

(Continued)

*Primary Examiner* — Ronnie Mancho
(74) *Attorney, Agent, or Firm* — Fitzpatrick, Cella, Harper & Scinto

(57) ABSTRACT

The positions and orientations of one or more target objects are obtained from the result of measuring a set of target objects by using a first sensor. A robot including a grip unit is controlled to grip one target object as a gripping target object among the target objects by the grip unit. Whether the grip unit has succeeded in gripping the gripping target object is determined from the result of measurement performed by a second sensor for measuring the target object gripped by the grip unit. When the grip unit has been determined to fail in gripping the gripping target object, one target object interacting with the gripping target object is selected among the target objects. The robot is controlled to grip the selected target object by the grip unit.

15 Claims, 11 Drawing Sheets

(56) References Cited

U.S. PATENT DOCUMENTS

| | | | |
|---|---|---|---|
| 4,942,539 A | 7/1990 | McGee et al. | |
| 4,985,846 A | 1/1991 | Fallon | |
| 5,127,029 A | 6/1992 | Suzuki et al. | |
| 5,499,306 A | 3/1996 | Sasaki et al. | |
| 5,501,498 A * | 3/1996 | Ulrich | 294/106 |
| 5,513,299 A | 4/1996 | Terasaki et al. | |
| 5,943,476 A | 8/1999 | Dougherty et al. | |
| 6,101,455 A | 8/2000 | Davis | |
| 6,414,711 B2 | 7/2002 | Arimatsu et al. | |
| 6,658,962 B1 * | 12/2003 | Rosheim | 74/490.05 |
| 6,730,926 B2 | 5/2004 | Boillot et al. | |
| 6,757,422 B1 | 6/2004 | Suzuki et al. | |
| 6,856,341 B2 | 2/2005 | Suzuki | 348/51 |
| 6,927,955 B2 | 8/2005 | Suzui et al. | |
| 7,084,900 B1 | 8/2006 | Watanabe et al. | |
| 7,171,041 B2 | 1/2007 | Watanabe et al. | |
| 7,177,459 B1 | 2/2007 | Watanabe et al. | |
| 7,313,464 B1 | 12/2007 | Perreault et al. | |
| 7,589,747 B2 | 9/2009 | Matsui et al. | 345/633 |
| 7,728,852 B2 | 6/2010 | Suzuki et al. | 345/632 |
| 7,868,904 B2 | 1/2011 | Morita et al. | 345/633 |
| 7,952,728 B2 | 5/2011 | Ibach et al. | |
| 7,957,583 B2 | 6/2011 | Boca et al. | |
| 7,965,904 B2 | 6/2011 | Kobayashi | 382/292 |
| 7,966,094 B2 | 6/2011 | Ban et al. | |
| 7,996,114 B2 | 8/2011 | Ban et al. | |
| 8,265,403 B2 * | 9/2012 | Abe et al. | 382/233 |
| 8,295,975 B2 * | 10/2012 | Arimatsu et al. | 700/216 |
| 8,416,722 B2 | 4/2013 | Suzuki | |
| 8,437,535 B2 | 5/2013 | Boca et al. | |
| 9,026,234 B2 * | 5/2015 | Suzuki | 700/56 |
| 2001/0010539 A1 | 8/2001 | Arimatsu et al. | |
| 2002/0101506 A1 | 8/2002 | Suzuki | |
| 2004/0103740 A1 * | 6/2004 | Townsend et al. | 74/490.01 |
| 2005/0234981 A1 | 10/2005 | Manousos et al. | |
| 2006/0095143 A1 * | 5/2006 | Sunaoshi | 700/3 |
| 2009/0310583 A1 | 12/2009 | Suzuki | |
| 2010/0004778 A1 * | 1/2010 | Arimatsu et al. | 700/214 |
| 2010/0289797 A1 * | 11/2010 | Tateno et al. | 345/419 |
| 2011/0164114 A1 | 7/2011 | Kobayashi et al. | 348/46 |
| 2011/0190932 A1 * | 8/2011 | Tsusaka et al. | 700/254 |
| 2011/0208355 A1 * | 8/2011 | Tsusaka | 700/246 |
| 2011/0222995 A1 | 9/2011 | Irie et al. | |
| 2012/0121135 A1 | 5/2012 | Kotake et al. | |
| 2013/0006423 A1 * | 1/2013 | Ito et al. | 700/259 |
| 2013/0151007 A1 * | 6/2013 | Valpola et al. | 700/245 |
| 2013/0158947 A1 * | 6/2013 | Suzuki | 702/155 |
| 2013/0184870 A1 * | 7/2013 | Ota et al. | 700/262 |
| 2013/0238124 A1 * | 9/2013 | Suzuki et al. | 700/250 |
| 2013/0238125 A1 * | 9/2013 | Suzuki | 700/253 |
| 2013/0238128 A1 * | 9/2013 | Suzuki | 700/258 |
| 2013/0245828 A1 * | 9/2013 | Tateno et al. | 700/259 |

FOREIGN PATENT DOCUMENTS

| | | |
|---|---|---|
| JP | 2000-278716 A | 10/2000 |
| JP | 4226623 B2 | 2/2009 |
| JP | 2011-27623 A | 2/2011 |

OTHER PUBLICATIONS

U.S. Appl. No. 13/829,362, filed Mar. 14, 2013 Applicant: Motoharu Suzuki.

K.S. Arun, et al., "Least-Squares Fitting of Two 3-D Point Sets", IEEE Pattern Analysis and Machine Intelligence, vol. 9, No. 5, 1987.

U.S. Appl. No. 13/784,684, filed Mar. 4, 2013. Applicant: Masahiro Suzuki.

U.S. Appl. No. 13/775,888, filed Feb. 25, 2013. Applicant Masahiro Suzuki.

* cited by examiner

FIG. 2D

| POINT | x | y | z |
|---|---|---|---|
| P1 | 0 | 0 | 0 |
| P2 | 20 | 140 | 0 |
| P3 | 80 | 140 | 0 |
| P4 | 100 | 0 | 0 |
| P5 | 0 | 0 | 600 |
| P6 | 20 | 140 | 600 |
| P7 | 80 | 140 | 600 |
| P8 | 100 | 0 | 600 |

FIG. 2E

| LINE | TWO POINTS AT TWO ENDS |
|---|---|
| L1 | P1, P2 |
| L2 | P2, P3 |
| L3 | P3, P4 |
| L4 | P1, P4 |
| L5 | P2, P6 |
| L6 | P3, P7 |
| L7 | P4, P8 |
| L8 | P1, P5 |
| L9 | P5, P6 |
| L10 | P6, P7 |
| L11 | P7, P8 |
| L12 | P5, P8 |

FIG. 2F

| SURFACE | SURROUNDING LINES | NORMAL (x,y,z) |
|---|---|---|
| S1 | L1, L2, L3, L4 | (0, 0, -1) |
| S2 | L1, L5, L8, L9 | (-0.88, 0.12, 0) |
| S3 | L2, L5, L6, L10 | (0, 1, 0) |
| S4 | L3, L6, L7, L11 | (0.88, 0.12, 0) |
| S5 | L4, L7, L8, L12 | (0, -1, 0) |
| S6 | L9, L10, L11, L12 | (0, 0, 1) |

INFORMATION PROCESSING APPARATUS AND INFORMATION PROCESSING METHOD

BACKGROUND OF THE INVENTION

1. Field of the Invention

The present invention relates to a technique of obtaining the position and orientation of a target object.

2. Description of the Related Art

Along with the recent development of robot technologies, robots are replacing humans to do complex tasks such as assembly of industrial products, which have been done by humans. A robot picks parts using an end effector such as a hand, and assembles them. Conventionally, parts to be picked are supplied using an apparatus called a parts feeder for supplying parts one by one in line, or supplied by heaping parts in various orientations in a pallet (box). When the parts feeder is used, each part is supplied in a predetermined position and orientation, and the robot relatively easily picks it. However, it additionally costs to prepare the parts feeder. In some cases, different parts feeders need to be prepared in accordance with the shapes of parts. In contrast, heaping and supplying parts can avoid an increase in cost because parts are only placed in the pallet. Following a recent trend toward high-mix low-volume production, attention is paid to heaped supply capable of quickly coping with various parts.

In a conventional technique disclosed in Japanese Patent No. 04226623, if extraction or gripping of a part by a robot from a heap fails, the target part is excluded from gripping targets by a predetermined number of times. Excluding the part failed in extraction or gripping by a predetermined number of times can avoid a repetitive failure for a while.

However, the method disclosed in Japanese Patent No. 04226623 passively waits for a change of the positions and orientations of parts by excluding a part failed in extraction by the robot from gripping targets by a predetermined number of times. In this method, the number of gripping target candidates decreases while work is done by a predetermined number of times. Since the number of heaped parts is limited, work cannot be performed efficiently if the number of candidates decreases.

SUMMARY OF THE INVENTION

The present invention has been made to solve the above problems, and provides a technique for performing efficient work without decreasing the number of gripping target candidates.

According to the first aspect of the present invention, an information processing apparatus comprising: a calculation unit which calculates a position and orientation of at least one target object from a result of measuring a set of target objects by using a first sensor; a control unit which controls a robot including a grip unit to grip, as a gripping target object, one target object among the at least one target object by the grip unit; a determination unit which determines whether the grip unit has succeeded in gripping the gripping target object, from a result of measurement performed by a second sensor for measuring the target object gripped by the grip unit; and a selection unit which, when the grip unit has been determined to fail in gripping the gripping target object, selects one target object interacting with the gripping target object among the at least one target object, wherein the control unit controls the robot to grip, by the grip unit, the target object selected by the selection unit.

According to the second aspect of the present invention, an information processing apparatus comprising: a calculation unit which calculates a position and orientation of at least one target object from a result of measuring a set of target objects by using a sensor; a prediction unit which predicts, based on a result calculated by the calculation unit for one target object among the at least one target object, whether a grip unit of a robot will succeed in gripping the one target object; a selection unit which, when the prediction unit predicts that the grip unit will fail in gripping the one target object, selects one target object interacting with the one target object among the at least one target object; and a control unit which controls the robot to grip, by the grip unit, the one target object selected by the selection unit.

According to the third aspect of the present invention, an information processing method comprising: a calculation step of calculating a position and orientation of at least one target object from a result of measuring a set of target objects by using a first sensor; a control step of controlling a robot including a grip unit to grip, as a gripping target object, one target object among the at least one target object by the grip unit; a determination step of determining whether the grip unit has succeeded in gripping the gripping target object, from a result of measurement performed by a second sensor for measuring the target object gripped by the grip unit; and a selection step of, when the grip unit has been determined to fail in gripping the gripping target object, selecting one target object interacting with the gripping target object among the at least one target object, wherein in the control step, the robot is controlled to grip, by the grip unit, the target object selected in the selection step.

According to the fourth aspect of the present invention, an information processing method comprising: a calculation step of calculating a position and orientation of at least one target object from a result of measuring a set of target objects by using a sensor; a prediction step of predicting, based on a result calculated in the calculation step for one target object among the at least one target object, whether a grip unit of a robot will succeed in gripping the one target object; a selection step of, when the grip unit is predicted in the prediction step to fail in gripping the one target object, selecting one target object interacting with the one target object among the at least one target object; and a control step of controlling the robot to grip, by the grip unit, the one target object selected in the selection step.

Further features of the present invention will become apparent from the following description of exemplary embodiments with reference to the attached drawings.

BRIEF DESCRIPTION OF THE DRAWINGS

FIGS. 2A to 2F are views for explaining a three-dimensional geometric model;

DESCRIPTION OF THE EMBODIMENTS

Figure 1:
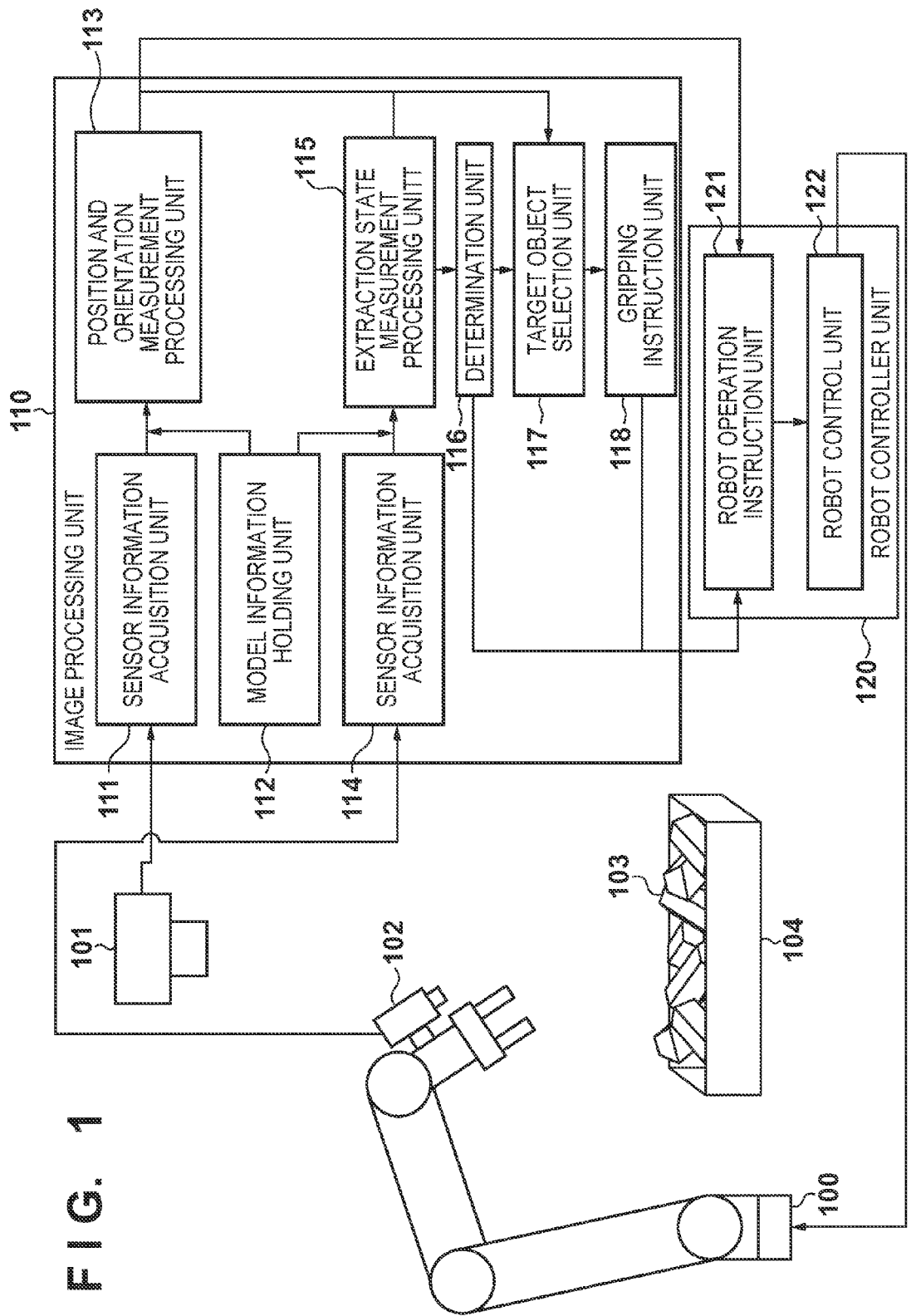
FIG. 1 is a view exemplifying the arrangement of a system.

Embodiments of the present invention will now be described with reference to the accompanying drawings. Note that the embodiments to be explained below are examples of concretely practicing the present invention, and are detailed examples of an arrangement described in the claims.

First Embodiment

In the first embodiment, the positions and orientations of target objects heaped in a pallet are measured using the first sensor (a projector and camera) for acquiring two-dimensional information (a two-dimensional image) and three-dimensional information (a range image or a two-dimensional image for obtaining three-dimensional point group data) about target objects.

Further, the extraction state of a target object to be extracted by a robot is measured using the second sensor (a projector and camera) which is mounted on the robot and acquires three-dimensional information (a range image or a two-dimensional image for obtaining three-dimensional point group data) about target objects.

If it is determined that the extraction by the robot has failed, a target object interacting with one failed in extraction is selected based on the positions and orientations of target objects in the pallet that have been measured using the first sensor. In the embodiment, an interacting target object on a two-dimensional image is selected based on the positions and orientations of target objects in the pallet. Then, the robot is instructed to grip the selected target object. The robot grips the target object in accordance with the instruction. First, the arrangement of a system according to the first embodiment will be exemplified with reference to FIG. 1.

A robot 100 is an articulated robot and operates in response to a control instruction from a robot controller unit 120. A hand serving as an end effector is mounted on the distal end of the robot 100 and can do work for a target object. In the embodiment, a hand with a chuck mechanism capable of gripping a target object is used as the end effector. The end effector may use a motor-driven hand or a suction pad for sucking a target object by air pressure.

Assume that calibration work has been performed in advance by a well-known technique for the position and orientation of a sensor unit 101, the positions and orbits of the robot 100 and the hand, and the relative position and orientation between the arm of the robot 100 and a sensor unit 102. This makes it possible to convert the position and orientation of a target object in a pallet 104 that is measured by a position and orientation measurement processing unit 113, and the position and orientation of the target object measured by an extraction state measurement processing unit 115 into those in a work space coordinate system fixed in a space where the pallet 104 is placed. The robot 100 can also be controlled to move the hand to a position and orientation designated in the work space coordinate system.

The sensor unit 101 includes a projector and a camera for sensing a two-dimensional image as two-dimensional information. The sensor unit 101 is fixed above the pallet 104, senses an image of heaped target objects 103, and outputs the sensed image to a sensor information acquisition unit 111. Although an image processing unit 110 processes the image sensed by the sensor unit 101 in the embodiment, the sensor unit 101 may incorporate an image processing mechanism to output an image processing result. Assume that the relative positional relationship between the projector and camera of the sensor unit 101 has been obtained in advance by calibration.

The projector of the sensor unit 101 irradiates the target object 103 with a predetermined pattern image (pattern light) (projects the pattern image). The camera of the sensor unit 101 senses the target object 103 on which the pattern image is projected, and outputs the sensed image to the sensor information acquisition unit 111. As the predetermined pattern image, an image such as a plurality of stripe patterns or a plurality of line patterns having different widths in a space encoding method is used. A two-dimensional pattern or random dot pattern is also available. The position and orientation measurement processing unit 113 uses the sensed image via the sensor information acquisition unit 111 to obtain a distance based on the principle of triangulation.

The projector of the sensor unit 101 can irradiate a target object with uniform-luminance light. The camera of the sensor unit 101 senses an image of the target object irradiated with the uniform-luminance light, and outputs a two-dimensional image to the sensor information acquisition unit 111.

The sensor unit 102 includes a compact projector and a compact camera for sensing a two-dimensional image. The sensor unit 102 is fixed and mounted near the hand whose position and orientation can be controlled (changed) by the angle of each joint of the robot 100. The sensor unit 102 senses a target object gripped by the hand. Assume that the relative positional relationship between the projector and camera of the sensor unit 102 has been obtained in advance by calibration. Although the image processing unit 110 processes an image sensed by the sensor unit 102 in the embodiment, the sensor unit 102 may incorporate an image processing mechanism to output an image processing result.

The projector of the sensor unit 102 irradiates the target object 103 with a predetermined pattern image (pattern light) (projects the pattern image). The camera of the sensor unit 102 senses the target object 103 on which the pattern image is projected, and outputs the sensed image to a sensor information acquisition unit 114. As the predetermined pattern image, an image such as a plurality of stripe patterns or a plurality of line patterns having different widths in a space encoding method is used. A two-dimensional pattern or random dot pattern is also available. The sensor unit 102 may include a diffraction grating, illuminator, and camera. In this case, the diffraction grating and illuminator project pattern light on a target object, and the camera senses the pattern. The extraction state measurement processing unit 115 uses the sensed image via the sensor information acquisition unit 114 to obtain a distance based on the principle of triangulation.

The target objects 103 are parts forming an industrial product. The robot 100 picks the target objects 103 and assembles them into a product. Various materials are usable, including plastic, metal, and vinyl. The target objects 103 are heaped in the pallet 104 in various orientations.

The pallet 104 is a box for containing the target objects 103. Although the material of the pallet is not limited, the pallet is often made of plastic or paper. Further, the shape of the pallet is not limited, but is often a cube or rectangular parallelepiped for ease of manufacturing. Also, the size of the pallet is not limited, but is generally designed so that it falls within a range measurable by the sensor unit 101.

Next, the image processing unit 110 functioning as an information processing apparatus will be described.

The sensor information acquisition unit 111 acquires a sensed image of the target objects 103 that has been obtained by the sensor unit 101, and outputs the acquired sensed image to the position and orientation measurement processing unit 113. The sensor unit 101 includes the projector for emitting pattern light and uniform-luminance light. The sensor information acquisition unit 111 acquires a sensed image of the target object 103 irradiated with the pattern light and uniform-luminance light.

A model information holding unit 112 holds model information used to measure the position and orientation of the target object 103 by the position and orientation measurement processing unit 113 and the extraction state measurement processing unit 115. An example of the model information is the three-dimensional geometric model of the target object 103 based on three-dimensional CAD. Another example of the model information is a reference image model which is a set of reference images obtained when the actual target object 103 or a three-dimensional geometric model simulating the target object 103 is viewed from a plurality of predetermined viewpoints.

The three-dimensional geometric model is a CAD model itself which can be handled by three-dimensional CAD software, or a model obtained by converting a three-dimensional CAD model into a plurality of polygon elements used in the computer graphics field. The embodiment adopts a three-dimensional geometric model formed from polygon elements. The three-dimensional geometric model formed from polygon elements will be explained with reference to FIGS. 2A to 2F.

Figure 2A:
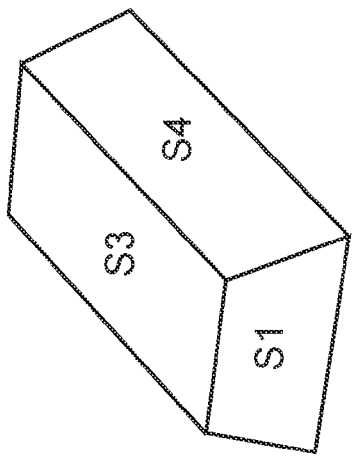
Figure 2B:
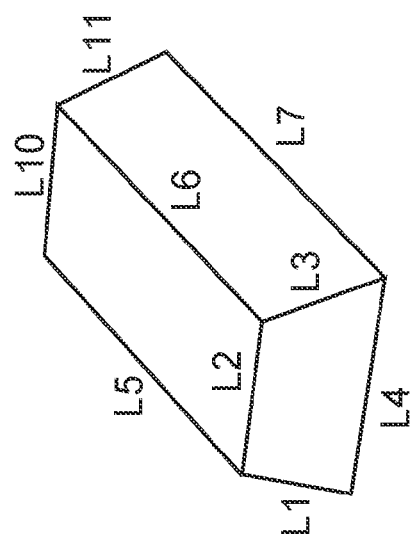
Figure 2C:
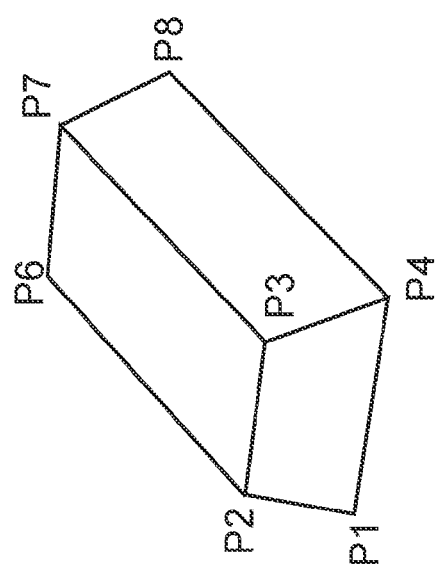

The three-dimensional geometric model formed from polygon elements includes building components such as points, lines, and surfaces as shown in FIGS. 2A to 2C. FIGS. 2A to 2C show the same three-dimensional geometric model.

For each vertex of the three-dimensional geometric model exemplified in FIG. 2A, model information of the three-dimensional geometric model formed from polygon elements manages the index of the vertex and the three-dimensional coordinate values of the vertex, as shown in FIG. 2D.

For each side of the three-dimensional geometric model exemplified in FIG. 2B, the model information manages the index of the side and the indices of vertices at the two ends of the side, as shown in FIG. 2E.

For each surface (polygon) of the three-dimensional geometric model exemplified in FIG. 2C, the model information manages the index of the polygon, the indices of the respective sides of the polygon, and the normal vector of the polygon, as shown in FIG. 2F.

A reference image model is data including a plurality of two-dimensional images. A reference image model based on an actually sensed image is created from images sensed with the camera from various directions by using the target object 103 as the center. A plurality of cameras may be arranged by setting up a scaffold for image sensing, the user may hold a camera to sense an image, or a camera mounted on the robot may sense an image while moving the robot. Although an image may be sensed by any method, the relative position and orientation between the camera and the target object 103 in image sensing is obtained and stored in association with the sensed image. When a plurality of cameras are arranged on the scaffold, the relative position and orientation can be obtained from the shape of the scaffold. When the user holds a camera, the relative position and orientation can be obtained from a position and orientation sensor by mounting it on the camera. When the camera mounted on the robot senses an image, the relative position and orientation can be obtained using control information of the robot.

Figure 3:
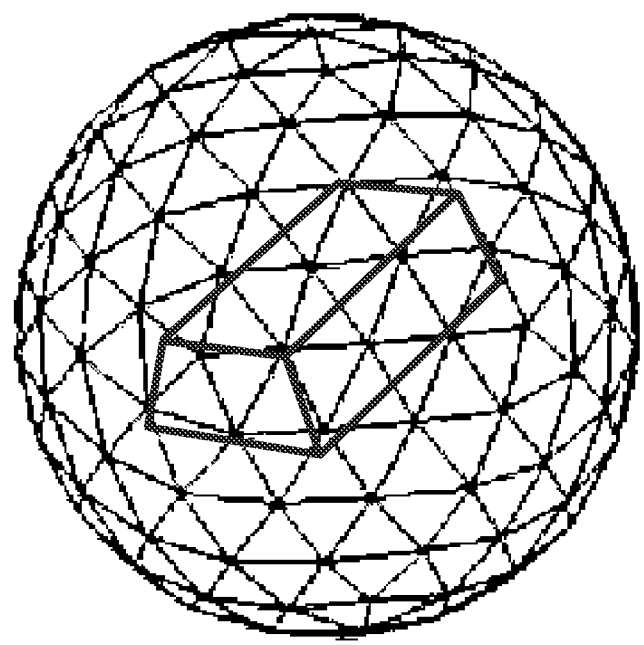
FIG. 3 is a view showing a CAD model and a geodesic sphere surrounding the CAD model.

As for a reference image model based on a three-dimensional geometric model simulating the target object 103, a geodesic sphere in which vertices have the same distance from the center of a CAD model is set, and an image viewed from each vertex of the geodesic sphere toward the center of the CAD model is used. The geodesic sphere has a plurality of vertices, and the distances between adjacent vertices are equal. A given vertex is set as a reference position, and a direction from which the CAD model is viewed is obtained based on the relative relationship with another vertex and is stored together with an image. FIG. 3 shows a CAD model and a geodesic sphere surrounding it. A set of images obtained by viewing the center from the respective vertices of the geodesic sphere is defined as a reference image model. Note that the reference image model may be a luminance image or a range image.

If it is already known that the target objects 103 are of only one type, model information of only this type is stored in the model information holding unit 112. If a plurality of types of target objects are dealt with, a plurality of types of model information are stored in the model information holding unit 112 and switched when used.

By using the sensed image output from the sensor information acquisition unit 111 and the model information held by the model information holding unit 112, the position and orientation measurement processing unit 113 obtains the positions and orientations of one or more target objects (gripping candidate objects) which can be gripped by the hand of the robot 100 in the pallet 104.

When a three-dimensional geometric model is used as model information, the position and orientation of the target object 103 is obtained by associating a line serving as a side of the three-dimensional geometric model with an edge component extracted from the sensed image output from the sensor information acquisition unit 111. In the embodiment, the coarse position and orientation of the three-dimensional geometric model is repeatedly corrected by an iterative operation so that the edge of the target object 103 coincides with a portion corresponding to the edge in the three-dimensional geometric model in the sensed image. The correction result is obtained as the position and orientation of the target object 103.

The position and orientation of the target object can also be obtained by associating point group data of a surface extracted from the three-dimensional geometric model with a distance point group extracted from a two-dimensional pattern image output from the sensor information acquisition unit 111. The distance point group can be obtained from the pattern image by using a well-known technique such as a space encoding method or light-section method, and this is not described in detail in the embodiment. To obtain the position and orientation of the target object by using the obtained distance point group and the model information, the embodiment adopts the ICP (Iterative Closest Point) method. The position and orientation of the target object is repeatedly corrected by an iterative operation. Further, the position and orientation of the target object can be obtained by taking account of both edge association and distance point group association.

When a reference image model is used as model information, a reference image which best matches a sensed image is obtained by template matching using the reference image model as a template, and the position and orientation of the target object 103 is obtained based on a relative position and orientation associated with the obtained reference image.

The position and orientation measurement processing unit 113 outputs the positions and orientations of one or more gripping candidate objects to a robot work instruction unit 121 and a target object selection unit 117. The robot work instruction unit 121 sends, to a robot control unit 122, an instruction signal which instructs to grip, by the hand, a gripping candidate object having one position and orientation among these positions and orientations.

The sensor information acquisition unit 114 acquires a sensed image of the target object 103 that has been obtained by the sensor unit 102, and outputs the acquired sensed image to the extraction state measurement processing unit 115.

The extraction state measurement processing unit 115 measures the extraction state of a target object by the hand of the robot 100 by using the sensed image output from the sensor information acquisition unit 114 and model information held by the model information holding unit 112. In the embodiment, it is measured as the extraction state whether the hand of the robot 100 has succeeded in extracting one of gripping candidate objects as a gripping target object. More specifically, if the hand has succeeded in extracting a gripping target object and the position and orientation of the gripping target object has been obtained, the position and orientation is used as the extraction state. If the extraction has failed and neither the position nor orientation has been obtained, information indicative of this is used as the extraction state.

When a three-dimensional geometric model is used as model information, the position and orientation of the target object is obtained by associating point group data of a surface extracted from the three-dimensional geometric model with a distance point group extracted from a two-dimensional pattern image output from the sensor information acquisition unit 114. By using a well-known technique such as a space encoding method or light-section method, the distance point group can be obtained from a sensed image of the target object on which the pattern image is projected. To obtain the position and orientation of the target object by using the obtained distance point group and the model information, the embodiment adopts the ICP (Iterative Closest Point) method. The position and orientation of the target object is repeatedly corrected by an iterative operation. Note that the method of obtaining the position and orientation of the target object is not limited to the ICP method.

When a reference image model is used as model information, a reference image which best matches a sensed image is obtained by template matching using the reference image model as a template, and the position and orientation of the target object is obtained based on a relative position and orientation associated with the reference image.

The extraction state measurement processing unit 115 sends the thus-obtained extraction state to a determination unit 116.

By using the extraction state output from the extraction state measurement processing unit 115, the determination unit 116 determines whether the robot 100 has succeeded in extracting a gripping target object. Note that "extraction has succeeded" means a state in which the robot 100 has extracted and gripped a target object for subsequent predetermined work (for example, assembly work). "Extraction has failed" means a state in which the robot has failed in gripping a target object and the target object remains in the pallet.

If the determination unit 116 determines that extraction has succeeded, it instructs the robot work instruction unit 121 to perform predetermined work (for example, assembly work) by the robot 100. If the determination unit 116 determines that extraction has failed, it outputs information representing the extraction failure to the target object selection unit 117 in order to select a target object to be gripped next.

The target object selection unit 117 receives, from the determination unit 116, the information representing the failure in extraction by the robot 100, and further receives the position and orientation output from the position and orientation measurement processing unit 113. Upon receiving these pieces of information, the target object selection unit 117 selects a target object to be gripped next by the robot 100. Then, the target object selection unit 117 outputs the position and orientation of the target object to be gripped next to a gripping instruction unit 118.

Upon receiving the position and orientation from the target object selection unit 117, the gripping instruction unit 118 instructs the robot work instruction unit 121 to grip the target object to be gripped next by the robot 100.

Next, the robot controller unit 120 will be described.

Based on the pieces of information obtained by the position and orientation measurement processing unit 113, the determination unit 116, and the gripping instruction unit 118, the robot work instruction unit 121 generates an instruction signal for moving the hand.

For example, if the robot work instruction unit 121 receives the position and orientation of a target object from the position and orientation measurement processing unit 113, it generates an instruction signal to move the hand to the position and orientation in which a target object in the received position and orientation can be gripped, and grip the target object.

Further, the robot work instruction unit 121 generates an instruction signal to move the hand and perform predetermined work (for example, assembly work) in accordance with an instruction from the determination unit 116.

The robot work instruction unit 121 generates an instruction signal to move the hand and grip a target object to be gripped next in accordance with an instruction from the gripping instruction unit 118.

Note that the robot work operations are not limited to movement, gripping, suction, and assembly, and also include other work operations such as inspection of the appearance of the target object 103, as a matter of course. Furthermore, the robot is not limited to an articulated robot, and may be a movable machine capable of NC control.

Upon receiving an instruction signal from the robot work instruction unit 121, a robot control unit 122 controls the operation of the robot 100 in accordance with the instruction signal. The position and orientation of the hand of the robot 100 can therefore be moved in accordance with the instruction signal.

Figure 4:
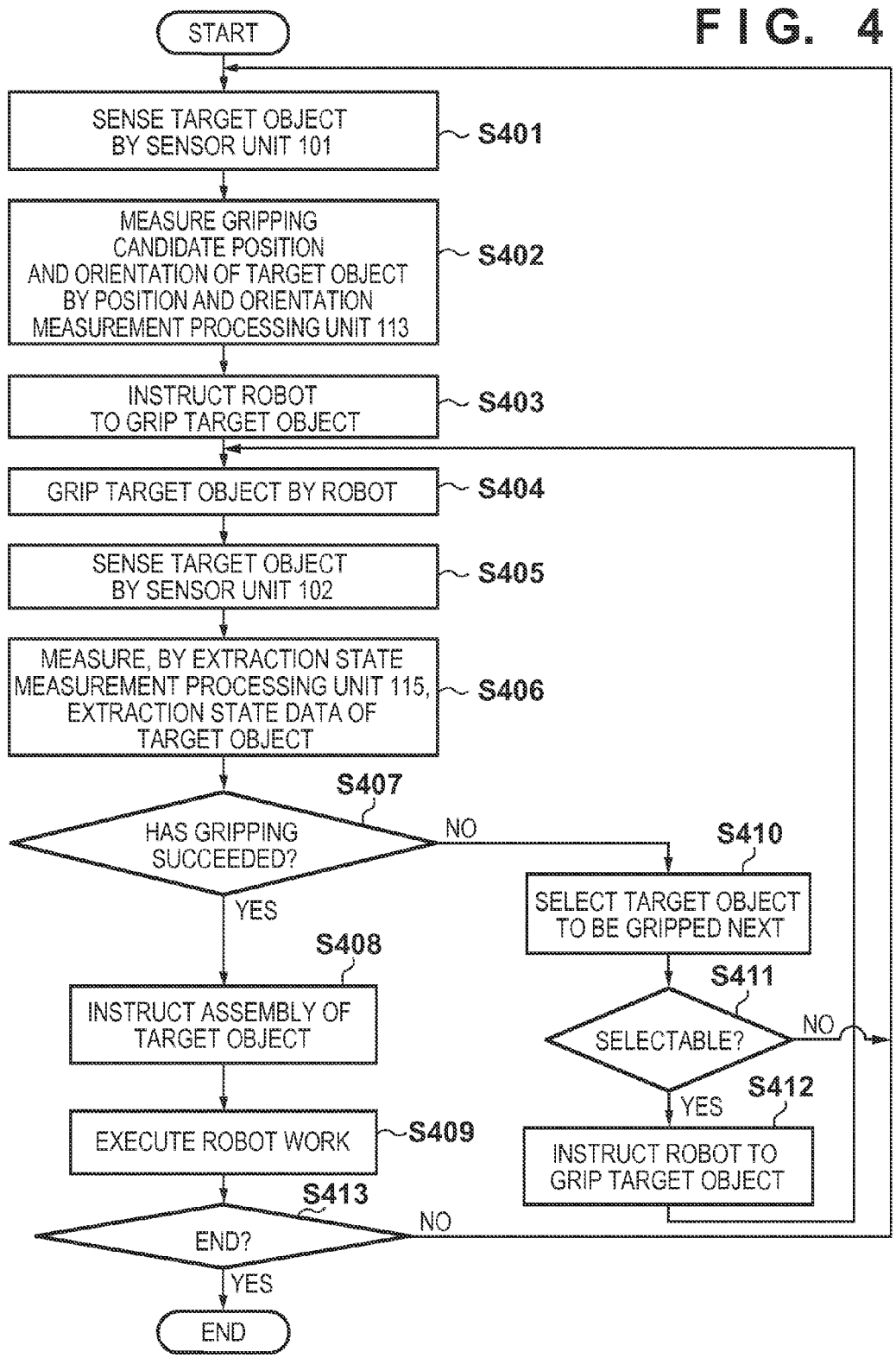
FIG. 4 is a flowchart showing the operation of the system.

The operation of the system according to the first embodiment will be described with reference to the flowchart of FIG. 4.

In step S401, the sensor unit 101 fixed above the pallet 104 senses an image of the target objects 103, and outputs the sensed image to the sensor information acquisition unit 111. Assume that the position and orientation of the sensor unit 101 has been obtained in advance by calibration. The sensor information acquisition unit 111 sends, to the position and orientation measurement processing unit 113, the sensed image of the target objects 103 that has been received from the sensor unit 101.

In step S402, the position and orientation measurement processing unit 113 obtains (measures) the position and orientation of at least one target object among a plurality of target objects in the sensed image received from the sensor information acquisition unit 111. The obtained position and orientation is used to extract and grip a target object by the robot.

As the method of measuring the position and orientation of a target object, the embodiment will explain three methods. As the first method, the embodiment will explain a method of measuring the position and orientation of the target object 103 by performing matching between a two-dimensional image of the target object irradiated with uniform-luminance light that is output from the sensor information acquisition unit 111, and model information held by the model information holding unit 112. As the second method, the embodiment will explain a method of obtaining the position and orientation of a target object by performing matching between a distance point group extracted from a two-dimensional pattern image output from the sensor information acquisition unit 111, and point group data of a surface extracted from a three-dimensional geometric model. As the third embodiment, the embodiment will explain a method of obtaining the position and orientation of a target object by taking account of both edge association and distance point group association.

The method of measuring the position and orientation of the target object 103 by performing matching between a two-dimensional image of the target object irradiated with uniform-luminance light that is output from the sensor information acquisition unit 111, and model information held by the model information holding unit 112 will be described as the first method.

When a three-dimensional geometric model is used as the model information, the position and orientation of the target object is obtained by associating a line serving as a side of the three-dimensional geometric model of the target object with an edge component extracted from the sensed image output from the sensor information acquisition unit 111. In the embodiment, the coarse position and orientation (represented by a six-dimensional vector s) of the target object to be measured is repeatedly corrected by an iterative operation using the Gauss-Newton method, which is a kind of nonlinear optimization method, so that the three-dimensional geometric model is fitted in the sensed image. Note that the optimization method for obtaining the position and orientation of a target object is not limited the Gauss-Newton method.

Figure 5B:
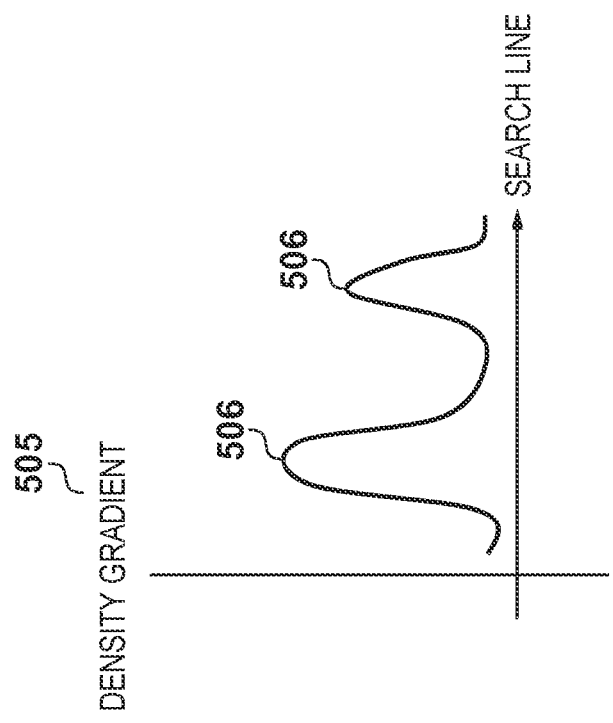
FIGS. 5A and 5B are views for explaining edge detection.
Figure 5A:
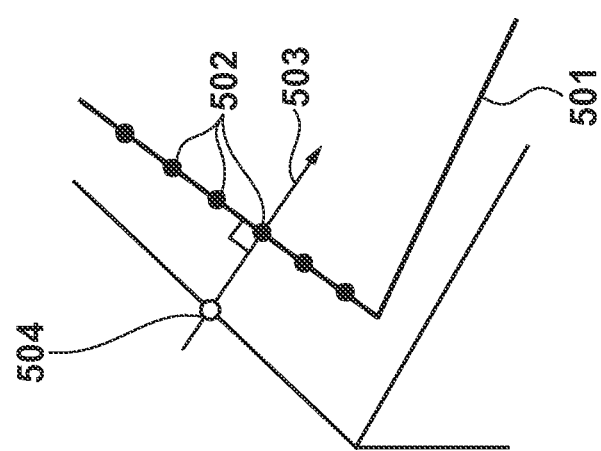

FIGS. 5A and 5B are views for explaining edge detection. A projection image, on the image, of each line segment forming the three-dimensional geometric model is calculated using the coarse position and orientation of the target object which has been obtained by some method (for example, template matching), and the calibrated internal parameters of the sensor unit 101. The projection image of a line segment is a line segment even on the image. Then, control points 502 are set on a projected line segment 501 at regular intervals on the image. For each control point 502, a one-dimensional edge 504 is detected in a direction 503 of the normal to the projected line segment 501 (FIG. 5A). Since an edge is detected as a local maximum of a density gradient 505 of a pixel value, a plurality of edges 506 may be detected, as shown in FIG. 5B. In the embodiment, all the detected edges are held.

To obtain the position and orientation of the target object by associating a line segment serving as a side of the three-dimensional geometric model with an edge component of the sensed image output from the sensor information acquisition unit 111, a coefficient matrix for calculating the position and orientation, and an error vector are calculated. Each element of the coefficient matrix is a first-order partial differential coefficient associated with each element of the position and orientation when the distance between a point and a straight line on the image is set as a function of the position and orientation. For an edge, the error vector is the signed distance between a projected line segment and a detected edge on the image. Derivation of the coefficient matrix will be described below.

Figure 6:
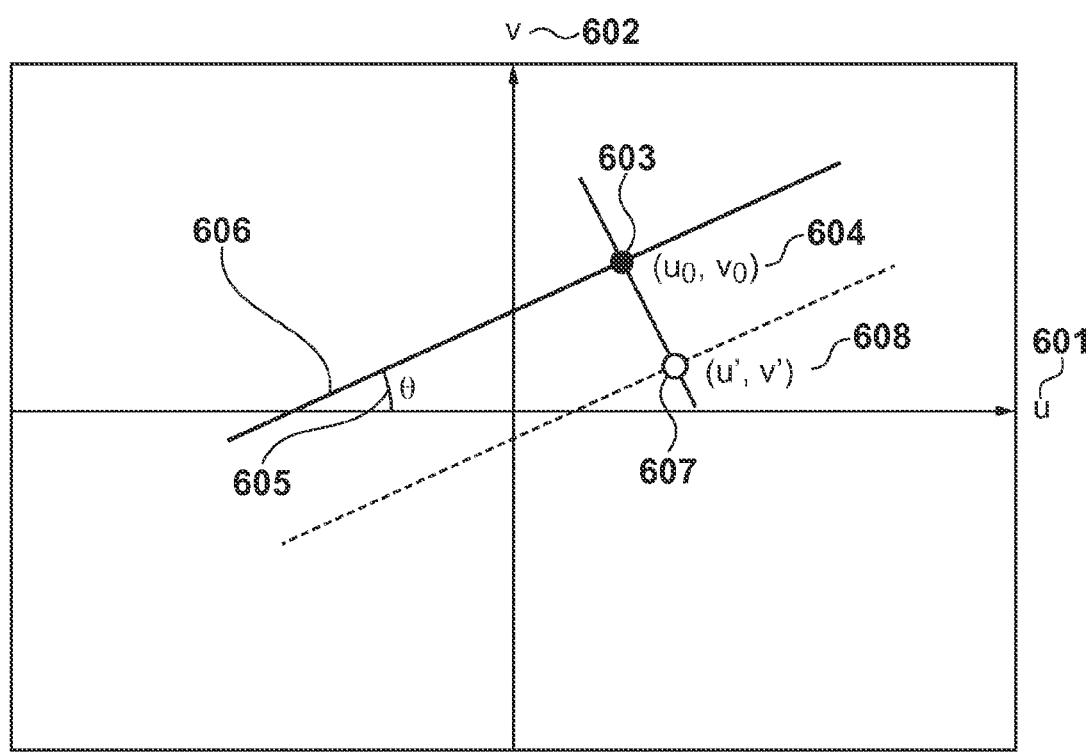
FIG. 6 is a graph for explaining the relationship between the projection image of a line segment and a detected edge.

FIG. 6 is a view for explaining the relationship between the projection image of a line segment and a detected edge. Referring to FIG. 6, a u-axis 601 represents the horizontal direction of the image and a v-axis 602 represents its vertical direction. (u0, v0) represents coordinates 604 of a given control point 603 (one of points which divide each projected line segment at regular intervals on the image) on the image. A slope θ 605 with respect to the u-axis 601 represents the slope, on the image, of the line segment to which the control point belongs. The slope θ 605 is calculated as the slope of a straight line obtained by projecting the three-dimensional coordinates of two ends of a line segment 606 on the image based on the six-dimensional vector s and connecting the coordinates of the two ends on the image. (sin θ, −cos θ) represents the normal vector of the line segment 606 on the image. (u', v') represents coordinates 608 of a point 607 corresponding to the control point 603 on the image. A point (u, v) on a straight line (a broken line in FIG. 6) which passes through the coordinates 608 (u', v') of the corresponding point 607 and has the slope θ 605 can be given by:

$$u \sin \theta - v \cos \theta = d$$

$$d = u' \sin \theta - v' \cos \theta \quad (1)$$

The position of the control point 603 on the image changes depending on the position and orientation of the target object. The position and orientation of the target object has six degrees of freedom. That is, s indicates a six-dimensional vector, and includes three elements representing the position of the target object and three elements representing its orientation. The three elements representing the orientation are expressed by, for example, Euler angles, or a three-dimensional vector, the direction of which represents a rotation axis passing through the origin, and the norm of which represents a rotation angle. The coordinates (u, v) of a point on the image that change depending on the position and orientation can be approximated by the first-order Taylor expansion near the coordinates 604 (u0, v0) according to expressions (2):

$$u \approx u_0 + \sum_{i=1}^{6} \frac{\partial u}{\partial s_i} \Delta s_i, \quad v \approx v_0 + \sum_{i=1}^{6} \frac{\partial v}{\partial s_i} \Delta s_i \quad (2)$$

where $\Delta s_i$ (i=1, 2, . . . , 6) is the infinitesimal change of each component of the six-dimensional vector s.

Assuming that the coarse position and orientation and the actual position and orientation are not so different, the position of the control point on the image, which is obtained by a correct six-dimensional vector s, can be assumed to exist on the straight line represented by equation (1). Substituting u and v approximated by expressions (2) into equation (1) yields equation (3):

$$\sin \theta \sum_{i=1}^{6} \frac{\partial u}{\partial s_i} \Delta s_i - \cos \theta \sum_{i=1}^{6} \frac{\partial v}{\partial s_i} \Delta s_i = d - r \quad (3)$$

where $r = u_0 \sin \theta - v_0 \cos \theta$ (constant).

Equation (3) is applicable to all edges having undergone association. Note that equation (3) may be applied to only some edges instead of all edges. Since equation (3) is an equation for the infinitesimal change $\Delta s_i$ (i=1, 2, . . . , 6) of each component of the six-dimensional vector s, linear simultaneous equations for $\Delta s_i$ can be set up as represented by equation (4):

$$\begin{bmatrix} \sin\theta_1 \frac{\partial u}{\partial s_1} - \cos\theta_1 \frac{\partial v}{\partial s_1} & \sin\theta_1 \frac{\partial u}{\partial s_2} - \cos\theta_1 \frac{\partial v}{\partial s_2} & \cdots & \sin\theta_1 \frac{\partial u}{\partial s_6} - \cos\theta_1 \frac{\partial v}{\partial s_6} \\ \sin\theta_2 \frac{\partial u}{\partial s_1} - \cos\theta_2 \frac{\partial v}{\partial s_1} & \sin\theta_2 \frac{\partial u}{\partial s_2} - \cos\theta_2 \frac{\partial v}{\partial s_2} & \cdots & \sin\theta_2 \frac{\partial u}{\partial s_6} - \cos\theta_2 \frac{\partial v}{\partial s_6} \\ \vdots & \vdots & \ddots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \end{bmatrix} \quad (4)$$

Here, equation (4) is rewritten into equation (5):

$$J\Delta s = E \quad (5)$$

To calculate the coefficient matrix J of the linear simultaneous equations, a partial differential coefficient is calculated. Based on equation (5), the correction value Δs of the position and orientation is obtained based on the least squares criterion using the generalized inverse matrix $(J^T \cdot J)^{-1} \cdot J^T$ of the matrix J. However, there are many outliers for edges due to a detection error and the like, so a robust estimation method to be described below is adopted. For an edge as an outlier, the value of the error vector on the right-hand side of equation (4) generally becomes large. From this, a small weight is given to information in which the absolute value of an error is large, and a large weight is given to information in which an error is small. The weights are given by Tukey functions as represented by equations (6):

$$w(z(d-r)) = \begin{cases} (1 - (z(d-r)/c_1)^2)^2 & |z(d-r)| \le c_1 \\ 0 & |z(d-r)| > c_1 \end{cases} \quad (6)$$

$$w(e-q) = \begin{cases} (1 - ((e-q)/c_2)^2)^2 & |e-q| \le c_2 \\ 0 & |e-q| > c_2 \end{cases}$$

where $c_1$ and $c_2$ are constants.

A function to give weights need not be a Tukey function, and the function is arbitrary, such as a Huber function, as long as the function gives a small weight to information in which an error is large, and a large weight to information in which an error is small. Let $w_i$ be a weight corresponding to each piece of measurement information (an edge or point group data). Then, a weight matrix W is defined as represented by equation (7):

$$W = \begin{bmatrix} w_1 & & & 0 \\ & w_2 & & \\ & & \ddots & \\ 0 & & & \end{bmatrix} \quad (7)$$

The weight matrix W is a square matrix in which all components except for diagonal components are 0, and weights $w_i$ are substituted into the diagonal components. By using the weight matrix W, equation (5) is rewritten into equation (8):

$$WJ\Delta s = WE \quad (8)$$

The correction value Δs is obtained by solving equation (8) as represented by equation (9):

$$\Delta s = (J^T W J)^{-1} J^T W E \quad (9)$$

The coarse position and orientation is corrected by solving the following equation using the calculated position and orientation correction value Δs:

$$s \leftarrow s + \Delta s$$

Whether the six-dimensional vector s has converged is determined. If the six-dimensional vector has converged, the calculation ends; otherwise, the calculation is repeated. When the correction value Δs is almost 0, or the sum of squares of the error vector hardly changes before and after correction, it is determined that the six-dimensional vector s has converged. By repeating the calculation until the six-dimensional vector s converges, the position and orientation can be calculated.

The embodiment has described the use of the Gauss-Newton method as the optimization method. However, a Levenberg-Marquardt method which makes calculation more robust, or a steepest descent method as a simpler method may be used. Also, another nonlinear optimization calculation method such as a conjugate gradient method or ICCG method may be used.

When a reference image model is used as model information, a reference image which best matches a sensed image is obtained by template matching using the reference image model as a template, and the position and orientation of the target object is obtained based on a relative position and orientation associated with the reference image. Let T(i, j) be the luminance of the reference image, and I(i, j) be the luminance of the sensed image. Then, when the reference image is an image having m×n pixels, the degree R of coincidence between the reference image and the sensed image can be obtained according to equation (10):

$$R = \sum_{j=0}^{n-1} \sum_{i=0}^{m-1} (I(i, j) - T(i, j))^2 \quad (10)$$

Next, the method of obtaining the position and orientation of a target object by performing matching between a distance point group extracted from a two-dimensional pattern image output from the sensor information acquisition unit 111, and point group data of a surface extracted from a three-dimensional geometric model will be described as the second method.

The distance point group can be obtained from the pattern image by using a well-known technique such as a space encoding method or light-section method, and this is not described in detail in the embodiment. To associate the point group of the three-dimensional geometric model with the range image point group, the embodiment adopts the ICP (Iterative Closest Point) method. A surface point group P of the three-dimensional geometric model is defined by:

$$P = \{p_1, p_2, \ldots, p_{N_p}\} \quad (11)$$

Also, a range image point group A is defined by:

$$A = \{a_1, a_2, \ldots, a_{N_a}\} \quad (12)$$

The surface point group P of the three-dimensional geometric model is converted to be aligned with the distance point group A. Assuming that a point of the point group A that has a shortest distance to each point pi of the point group P is represented by $b_i \in A$, an error function (13) can be defined by:

$$E(R, t) = \sum_{i=1}^{N_p} \|b_i - (Rp_i + t)\|^2 \qquad (13)$$

where R is the orientation parameter, and t is the motion vector.

R and t which decrease the error function E are obtained to perform correction according to expression (14):

$$P \leftarrow RP + t \qquad (14)$$

The method of obtaining R and t which decrease the error function E is described in K. S. Arun, T. S. Huang, and S. D. Blostein, "Least-Squares Fitting of Two 3-D Point Sets", PAMI, Vol. 9, No. 5, 1987.

Whether P has converged is determined. If P has converged, the correction calculation ends; otherwise, the correction calculation is repeatedly performed. For example, when P has hardly changed, it is determined that P has converged. The position and orientation can be calculated by repeating the correction calculation until P converges.

Finally, as the third method, the position and orientation of a target object can also be obtained by taking account of both edge association and distance point group association. This method can be implemented by applying, for example, a method disclosed in Japanese Patent Laid-Open No. 2011-27623.

After obtaining the position and orientation of the gripping candidate object in step S402, the position and orientation measurement processing unit 113 sends the obtained position and orientation to the robot work instruction unit 121 and the target object selection unit 117. If the position and orientation measurement processing unit 113 obtains the positions and orientations of a plurality of gripping candidate objects, it sends all the obtained positions and orientations to the robot work instruction unit 121 and the target object selection unit 117.

In step S403, the robot work instruction unit 121 generates an instruction signal to move the hand of the robot 100 to the position and orientation received from the position and orientation measurement processing unit 113, and sends the generated instruction signal to the robot control unit 122. If the robot 100 includes a pad for sucking the target object, the robot work instruction unit 121 generates, based on the position and orientation received from the position and orientation measurement processing unit 113, an instruction signal to move the pad of the robot 100 to a position and orientation where it can suck the target object 103.

Figure 7:
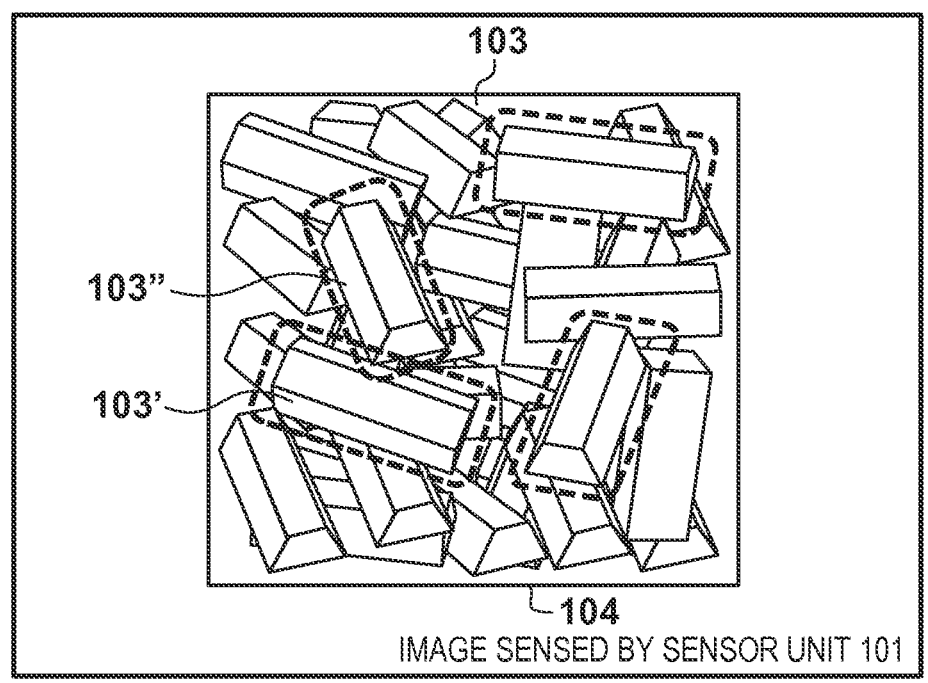
FIG. 7 is a view showing a gripping candidate object.

When the robot work instruction unit 121 receives the positions and orientations of a plurality of gripping candidate objects from the position and orientation measurement processing unit 113, it selects the position and orientation of one gripping candidate object from them. For example, the robot work instruction unit 121 selects a gripping candidate object at the top (a gripping candidate object having, of position components, a largest coordinate component in the direction of normal to the surface on which the pallet 104 is placed) that is highly likely to be able to be picked from the heap. FIG. 7 shows target objects (gripping candidate objects), surrounded by dotted lines, whose positions and orientations have been obtained from an image sensed by the sensor unit 101. As is apparent from FIG. 7, the positions and orientations of four gripping candidate objects have been obtained. Of these four gripping candidate objects, a top gripping candidate object 103' is selected as a gripping target object. Note that the dotted lines in FIG. 7 are illustrated merely for descriptive convenience and do not appear in an actual image.

In the embodiment, one target object is selected from a plurality of target objects whose positions and orientations have been measured by the robot work instruction unit 121. However, the position and orientation measurement processing unit 113 may select one target object and then output its position and orientation to the robot work instruction unit 121.

All the position and orientation measurement processing unit 113, the determination unit 116, and the gripping instruction unit 118 register, in a gripping instruction list managed in a memory unit (not shown) in the image processing unit 110, target objects whose positions and orientations have been sent to the robot work instruction unit 121. Information to be registered is not limited to specific information, and may be a position and orientation, information representing a position or area on a sensed image, or identification information assigned on a sensed image.

In step S404, the robot control unit 122 controls the robot 100 in accordance with the instruction signal from the robot work instruction unit 121, and moves the hand to a position and orientation indicated by the instruction signal. When the robot 100 is to grip the gripping candidate object 103', the robot control unit 122 controls the robot 100 to grip the gripping candidate object 103'. When the robot 100 is to suck the gripping candidate object 103', the robot control unit 122 controls the robot 100 to suck the gripping candidate object 103'.

In step S405, the sensor unit 102 mounted on the hand senses the gripping target object gripped (not always gripped) by the hand, and sends the sensed image to the sensor information acquisition unit 114. The sensor unit 102 includes a projector for emitting pattern light, and the sensor information acquisition unit 114 acquires an image of the gripping target object irradiated with pattern light. This image sensing is executed after moving the robot 100 by a predetermined distance (for example, 5 cm) to above the gripping point.

In step S406, the extraction state measurement processing unit 115 obtains the position and orientation of the gripping target object by using the sensed image acquired from the sensor information acquisition unit 114 and the model information held by the model information holding unit 112. To obtain the position and orientation of the gripping target object, the model information holding unit 112 outputs the model information held by it.

When a three-dimensional geometric model is used as model information, the position and orientation of the target object is obtained by associating a point group extracted from a surface of the three-dimensional geometric model with a range image point group obtained from the sensed image output from the sensor information acquisition unit 114. The distance point group can be obtained from the pattern image by using a well-known technique such as a space encoding method or light-section method, and this is not described in detail in the embodiment. The point group of the three-dimensional geometric model can be associated with the range image point group by using the ICP (Iterative Closest Point) method described in the second method in step S402.

When a reference image model is used as model information, a reference image which best matches the sensed image is obtained by template matching using the reference image model as a template, and the position and orientation of the target object is obtained based on a relative position and orientation associated with the reference image. The detailed method has been described in the second half of the first method in step S402.

If the extraction state measurement processing unit 115 can obtain the position and orientation of the gripping target object, it sends the obtained position and orientation to the determination unit 116. If the extraction state measurement processing unit 115 cannot obtain the position and orientation of the target object owing to a failure in, for example, extracting the target object by the hand of the robot 100, it outputs information indicative of this to the determination unit 116.

In step S407, if the determination unit 116 does not receive, from the extraction state measurement processing unit 115, information representing that neither the position nor orientation has been obtained, but receives the position and orientation, it determines that the extraction of the target object by the hand has succeeded. If the determination unit 116 receives, from the extraction state measurement processing unit 115, information representing that neither the position nor orientation has been obtained, it determines that the extraction of the target object by the hand has failed. Even when the determination unit 116 receives the position and orientation, if the position and orientation is greatly different from a position and orientation taught by teaching work or the like in advance in which the target object should be gripped, the determination unit 116 determines that the extraction has failed.

If the determination unit 116 determines that the extraction has succeeded, the process advances to step S408. If the determination unit 116 determines that the extraction has failed, the process advances to step S410.

In step S408, the determination unit 116 instructs the robot work instruction unit 121 to control the robot 100 to perform predetermined work (for example, assembly work).

In step S409, the robot work instruction unit 121 instructs the robot control unit 122 to execute the contents of the instruction received in step S408. The robot control unit 122 controls the robot 100 in accordance with the instruction signal from the robot work instruction unit 121, moves the hand to the position and orientation indicated by the instruction signal, and controls it to perform the predetermined work (for example, assembly work).

In step S410, to select a target object to be gripped next, the determination unit 116 outputs, to the target object selection unit 117, information (extraction failure information) representing that the extraction has failed. The target object selection unit 117 selects a target object to be gripped next by using the extraction failure information output from the determination unit 116, the position and orientation of the gripping candidate object output from the position and orientation measurement processing unit 113, and the gripping instruction list registered in the memory unit (not shown).

In the first embodiment, a gripping candidate object at a position closest to the target object failed in extraction is selected as a next gripping candidate among target objects whose positions and orientations have been measured in step S402, excluding target objects (unselected target objects) registered in the gripping instruction list. Gripping the closest target object as the gripping candidate by the robot 100 can positively change the position and orientation of the target object failed in extraction.

In an image sensed by the sensor unit 101 shown in FIG. 7, the target object 103' is a target object failed in extraction by the hand. Except for the target object 103', there are three target objects whose positions and orientations have been detected. Of these three target objects, a target object 103'' closest to the position of the target object 103' in the sensed image is selected as a target object to be gripped next. The closeness of target objects can be determined by comparing model barycentric positions obtained upon measuring the positions and orientations of target objects. The comparison is executed after converting the model barycentric positions from a local coordinate system defining the positions and orientations of target objects into the work space coordinate system.

In step S411, the target object selection unit 117 determines whether a target object to be gripped next has been selected in step S410. For example, in FIG. 7, the positions and orientations of the three target objects except for the target object 103' have been measured. However, if the position and orientation of even one target object has not been measured except for the target object 103', a target object to be gripped next cannot be selected. As a matter of course, when a target object matching the selection condition is not detected in step S410, a target object to be gripped next cannot be selected. These situations can be determined by referring to the position and orientation measurement result in step S402 and the gripping instruction list.

If a target object to be gripped next cannot be selected, the target object selection unit 117 outputs, to a mechanism (not shown) for swinging the pallet 104, an instruction to swing the pallet 104. After that, the process returns to step S401. Also, the target object selection unit 117 initializes the gripping instruction list.

If the target object selection unit 117 determines in step S411 that a target object to be gripped next has been selected in step S410, the process advances to step S412.

In step S412, the target object selection unit 117 sends, to the gripping instruction unit 118, the position and orientation of the selected target object (a position and orientation selected as the position and orientation of a gripping candidate among the positions and orientations obtained in step S402). The gripping instruction unit 118 sends the position and orientation of the selected target object to the robot work instruction unit 121.

The robot work instruction unit 121 generates an instruction signal to move the hand of the robot 100 to the position and orientation received from the gripping instruction unit 118, and then sends the generated instruction signal to the robot control unit 122. The gripping instruction unit 118 registers the selected target object in the gripping instruction list. Thereafter, the process returns to step S404.

In step S413, it is determined whether an end instruction has been received. If no end instruction has been received, the gripping instruction list is initialized and the process returns to step S401. If an end instruction has been received, the sequence ends to stop all the operations. Note that the user may press an emergency stop button (not shown) to end the sequence and stop all the operations without waiting for the end determination in step S413.

As described above, according to the first embodiment, the position and orientation of a target object is measured using a fixed sensor, and the state of extraction by the robot is measured using a sensor mounted on the robot. If it is determined that the extraction by the robot has failed, a target object at a closest position in a sensed image is selected as an interacting target object based on the positions and orientations of target objects in the pallet, and gripping is instructed. This can positively move the target object failed in extraction, and enables efficient work without decreasing the number of gripping target candidates. Since gripping of the next target object and movement of the target object failed in extraction are executed simultaneously, the tact time of the work process can be shortened.

<Modification>

Figure 8A:
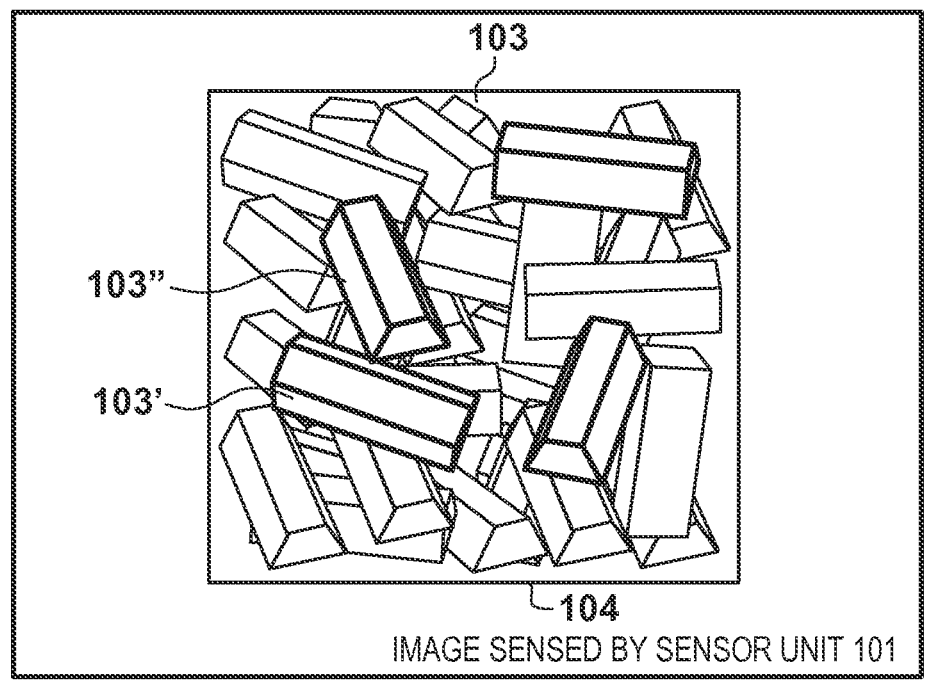
FIGS. 8A and 8B are views each showing a gripping candidate object.
Figure 8B:
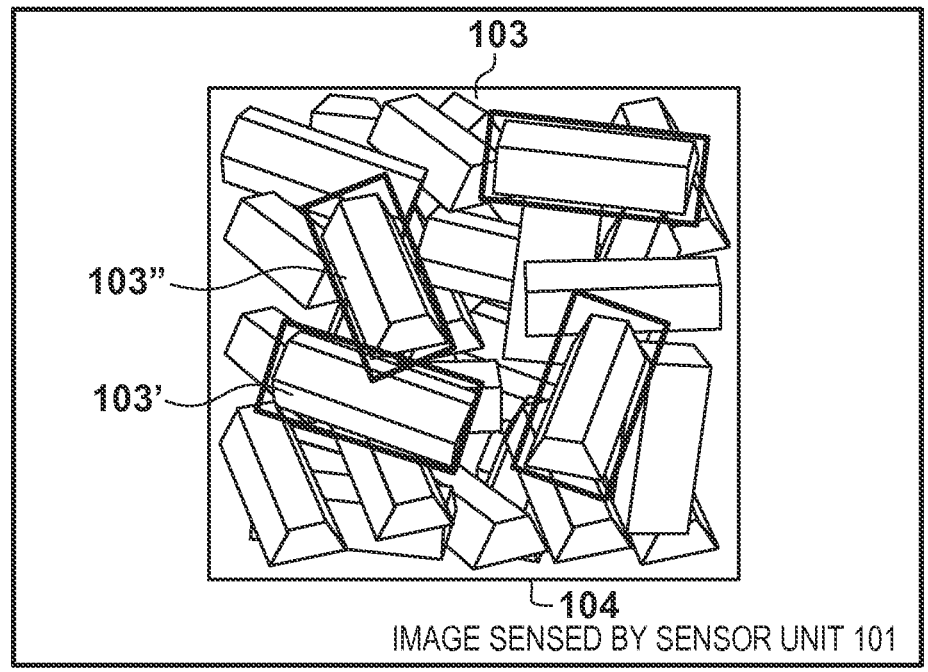

In the first embodiment, a target object at a closest position in a sensed image is selected as a next gripping candidate based on the positions and orientations of gripping candidate objects in the pallet. As a modification to the first embodiment, a target object overlapping one failed in extraction can be selected as a next gripping candidate. When models obtained upon measuring the positions and orientations of target objects in step S402 are projected and arranged onto a sensed image, as shown in FIG. 8A, and the outer shapes interfere with each other, it may be determined that the target objects overlap each other. Alternatively, when bounding boxes each surrounding a target object are arranged on a sensed image based on the positions and orientations of target objects, as shown in FIG. 8B, and they interfere with each other, it may be determined that the target objects overlap each other. In both FIGS. 8A and 8B, it is determined that the target object 103" interferes with the target object 103'. If extraction of the target object 103' fails, the target object 103" is selected as a target object to be gripped next. Note that interference between two areas can be determined by a known technique, and a description thereof will be omitted here.

As described above, in the modification to the first embodiment, a target object overlapping one failed in extraction is selected as a next gripping target, so the target object failed in extraction can be reliably moved.

Second Embodiment

In the second embodiment, when it is determined that extraction by a robot has failed, an interacting target object in the three-dimensional space is selected based on the positions and orientations of target objects in a pallet. The second embodiment is different from the first embodiment in only the operation of a target object selection unit 117 (step S410). Therefore, the operation of the target object selection unit 117 in the second embodiment will be explained below, and the remaining part is the same as that in the first embodiment, unless otherwise specified.

The target object selection unit 117 receives, from a determination unit 116, information representing that extraction by a robot 100 has failed, and further receives a position and orientation output from a position and orientation measurement processing unit 113. Upon receiving these pieces of information, the target object selection unit 117 selects a target object to be gripped next by the robot 100. The target object selection unit 117 outputs, to a gripping instruction unit 118, the position and orientation of the target object to be gripped next.

In step S410, to select a target object to be gripped next, the determination unit 116 outputs, to the target object selection unit 117, information representing that the extraction has failed. The target object selection unit 117 selects a target object to be gripped next by using the extraction failure information output from the determination unit 116, the position and orientation of the target object output from the position and orientation measurement processing unit 113, and the gripping instruction list.

A method of selecting a target object to be gripped next will be explained. In the second embodiment, a target object present at a deep position in the three-dimensional space from a target object failed in extraction when viewed from a sensor unit 101 is selected as a target object to be gripped next among target objects whose positions and orientations have been measured in step S402, excluding target objects registered in the gripping instruction list. "Present at a deep position in the three-dimensional space from a target object failed in extraction when viewed from the sensor unit 101" means "present at a position having a distance longer than a distance from the sensor unit 101 to a target object failed in extraction".

Gripping a target object below one failed in extraction by the robot 100 can positively change the position and orientation of the upper target object failed in extraction. Note that the target object below one failed in extraction includes a target object which exists below the target object failed in extraction so as to overlap each other, and a target object which may interact with the target object failed in extraction via another target object even if these target objects are spaced apart from each other in an image sensed by the sensor unit 101. A position in the three-dimensional space is a model barycentric position obtained when the position and orientation of a target object is measured. The model barycentric position is converted from a local coordinate system defining the positions and orientations of target objects into the work space coordinate system.

A target object may be simply selected based on the distance from the sensor unit 101. It is also possible to divide the area of heaped target objects in the pallet into respective heaps, and select, as a target object to be gripped next, a target object which exists at a deep position in the same heap as that of a target object failed in extraction. The area division into heaps can be achieved using a range image extracted from a pattern image sensed using the sensor unit 101. For example, the range image is divided into areas each of 100×100 pixels, and the average distance value of each area is set as the representative distance value of the area. Then, the representative distance values are interpolated, obtaining the contour lines of the heaped target objects. Since the gradient of the heap can be known from the contour lines, the area division into heaps can be implemented. Also, contour lines may be directly obtained from a range image to perform area division into heaps.

As described above, according to the second embodiment, when it is determined that extraction by the robot has failed, a target object at a deep position in the three-dimensional space from a target object failed in extraction when viewed from the sensor unit 101 is selected based on the positions and orientations of target objects in the pallet, and gripping is instructed. This can positively move the target object failed in extraction, and enables efficient work without decreasing the number of gripping target candidates. Since gripping of the next target object and movement of the target object failed in extraction are executed simultaneously, the tact time of the work process can be shortened. Since a target object below one failed in extraction is selected as a next gripping target, the heap can be changed to reliably move the target object failed in extraction.

<Modification>

In the second embodiment, a target object below one failed in extraction is selected as a next gripping candidate based on the positions and orientations of target objects in the pallet. As a modification to the second embodiment, a target object three-dimensionally interfering with a target object failed in extraction can be selected as a next gripping candidate. When models obtained upon measuring the positions and orientations of target objects in step S402 are arranged in the three-dimensional space, and the model surfaces interfere with each other or exist at very close positions (for example, within 1 mm), it may be determined that the target objects interfere with each other. Alternatively, when bounding boxes each surrounding a target object are arranged in the three-dimensional space based on the positions and orientations of target objects, and they interfere with each other, it may be determined that the target objects interfere with each other. Interference between two spaces can be determined by a known technique, and a description thereof will be omitted here.

As described above, in the modification to the second embodiment, a target object interfering with one failed in extraction is selected as a next gripping target, so the target object failed in extraction can be reliably moved.

Note that the first and second embodiments and their modifications are merely examples of the following arrangement, and can be arbitrarily modified and changed as long as the arrangement complies with the following arrangement. More specifically, the positions and orientations of one or more target objects are obtained from the result of measuring a set of target objects by using the first sensor. Then, a robot having a grip unit is controlled to grip one of the target objects as a gripping target object by the grip unit. Whether the grip unit has succeeded in gripping the gripping target object is determined from the result of measurement performed after the control by the second sensor for measuring a target object gripped by the grip unit. If the grip unit has failed in gripping the gripping target object, one of the target objects that interacts with the gripping target object is selected, and the robot is controlled to grip the selected target object by the grip unit.

Third Embodiment

In the third embodiment, the positions and orientations of target objects heaped in a pallet are measured using the first sensor (a projector and camera) for acquiring two-dimensional information (a two-dimensional image) and three-dimensional information (a range image or a two-dimensional image for obtaining three-dimensional point group data) about target objects.

Further, the extraction state of a target object to be gripped by a robot is predicted based on the measured positions and orientations of the target objects. If it is predicted that extraction by the robot will fail, a target object interacting with one predicted to fail in extraction is selected based on the positions and orientations of the target objects in the pallet that have been measured using the first sensor. The robot is then instructed to grip the selected target object. The robot grips the target object in accordance with the instruction.

Figure 9:
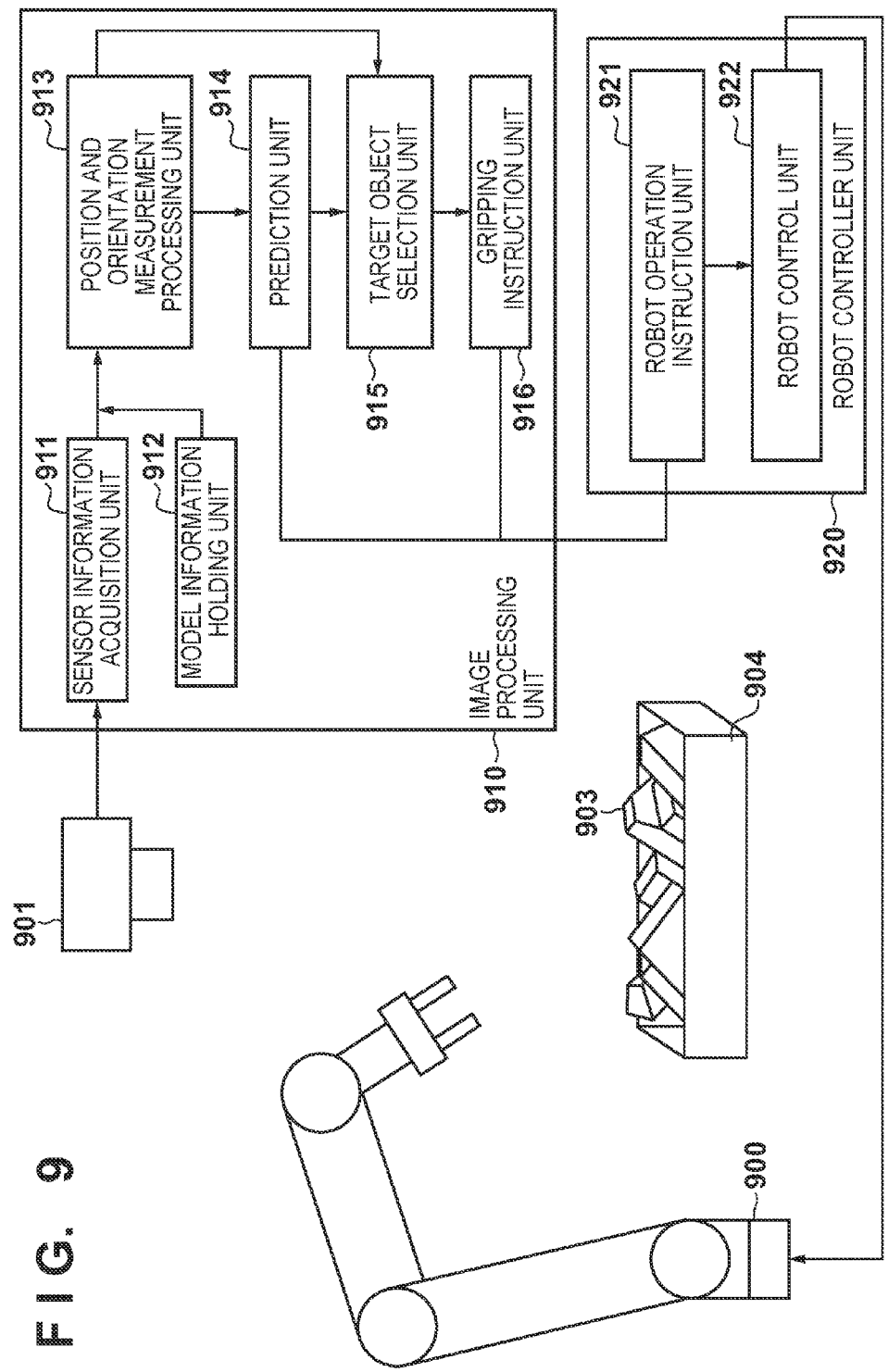
FIG. 9 is a view exemplifying the arrangement of a system.

The arrangement of a system according to the third embodiment will be exemplified with reference to FIG. 9.

A robot 900 is an articulated robot and operates in response to a control instruction from a robot controller unit 920. A hand serving as an end effector is mounted on the distal end of the robot 900 and can do work for a target object. In the embodiment, a hand with a chuck mechanism capable of gripping a target object is used as the end effector. The end effector may use a motor-driven hand or a suction pad for sucking a target object by air pressure.

Assume that calibration work has been performed in advance by a well-known technique for the position and orientation of a sensor unit 901, and the positions and orbits of the robot 900 and the hand. This makes it possible to convert the position and orientation of a target object in a pallet 904 that is measured by a position and orientation measurement processing unit 913 into those in a work space coordinate system fixed in a space where the pallet 904 is placed. The robot 900 can also be controlled to move the hand to a position and orientation designated in the work space coordinate system.

The sensor unit 901 includes a projector and a camera for sensing a two-dimensional image as two-dimensional information. The sensor unit 901 is fixed above the pallet 904, senses an image of heaped target objects 903, and outputs the sensed image to a sensor information acquisition unit 911.

Although an image processing unit 910 processes the image sensed by the sensor unit 901 in the embodiment, the sensor unit 901 may incorporate an image processing mechanism to output an image processing result. Assume that the relative positional relationship between the projector and camera of the sensor unit 901 has been obtained in advance by calibration.

The projector of the sensor unit 901 irradiates the target object 903 with a predetermined pattern image (pattern light) (projects the pattern image). The camera of the sensor unit 901 senses the target object 903 on which the pattern image is projected, and outputs the sensed image to the sensor information acquisition unit 911. As the predetermined pattern image, an image such as a plurality of stripe patterns or a plurality of line patterns having different widths in a space encoding method is used. A two-dimensional pattern or random dot pattern is also available. The position and orientation measurement processing unit 913 uses the sensed image via the sensor information acquisition unit 911 to obtain a distance based on the principle of triangulation.

The projector of the sensor unit 901 can irradiate a target object with uniform-luminance light. The camera of the sensor unit 901 senses an image of the target object irradiated with the uniform-luminance light, and outputs a two-dimensional image to the sensor information acquisition unit 911.

The target objects 903 are parts forming an industrial product. The robot 900 picks the target objects 903 and assembles them into a product. Various materials are usable, including plastic, metal, and vinyl. The target objects 903 are heaped in the pallet 904 in various orientations.

The pallet 904 is a box for containing the target objects 903. Although the material of the pallet is not limited, the pallet is often made of plastic or paper. Further, the shape of the pallet is not limited, but is often a cube or rectangular parallelepiped for ease of manufacturing. Also, the size of the pallet is not limited, but is generally designed so that it falls within a range measurable by the sensor unit 901.

Next, the image processing unit 910 functioning as an information processing apparatus will be described.

The sensor information acquisition unit 911 acquires a sensed image of the target objects 903 that has been obtained by the sensor unit 901, and outputs the acquired sensed image to the position and orientation measurement processing unit 913. The sensor unit 901 includes the projector for emitting pattern light and uniform-luminance light. The sensor information acquisition unit 911 acquires a sensed image of the target object 903 irradiated with the pattern light and uniform-luminance light.

A model information holding unit 912 holds model information used to measure the position and orientation of the target object 903 by the position and orientation measurement processing unit 913. The model information is the same as that in the first embodiment, and a description thereof will not be repeated.

By using the sensed image output from the sensor information acquisition unit 911 and the model information held by the model information holding unit 912, the position and orientation measurement processing unit 913 obtains the positions and orientations of one or more target objects (gripping candidate objects) which can be gripped by the hand of the robot 900 in the pallet 904. Position and orientation calculation processing by the position and orientation measurement processing unit 913 is the same as that by the position and orientation measurement processing unit 113 and has already been described in the first embodiment, and a description thereof will not be repeated. The position and orientation measurement processing unit 913 outputs the positions and orientations of one or more gripping candidate objects to a prediction unit 914 and a target object selection unit 915.

The prediction unit 914 predicts the extraction state of a target object to be extracted by the robot 900 based on the position and orientation of the gripping candidate object received from the position and orientation measurement processing unit 913. In the embodiment, whether extraction of a target object will succeed is predicted as the extraction state. Note that "extraction will succeed" means a state in which the robot 900 can extract and grip a target object for subsequent predetermined work (for example, assembly work). "Extraction will fail" means a state in which the robot will fail in gripping a target object and the target object remains in the pallet.

If the prediction unit 914 predicts that extraction will succeed, it instructs a robot work instruction unit 921 to perform predetermined work (for example, gripping or assembly work) by the robot 900. If the prediction unit 914 predicts that extraction will fail, it outputs information representing the extraction failure to the target object selection unit 915 in order to select a target object to be gripped next.

The target object selection unit 915 receives, from the prediction unit 914, the information representing the failure in extraction by the robot 900, and further receives the position and orientation output from the position and orientation measurement processing unit 913. Upon receiving these pieces of information, the target object selection unit 915 selects a target object to be gripped next by the robot 900. Then, the target object selection unit 915 outputs the position and orientation of a target object to be gripped next to a gripping instruction unit 916.

Upon receiving the position and orientation from the target object selection unit 915, the gripping instruction unit 916 instructs the robot work instruction unit 921 to grip the target object to be gripped next by the robot 900.

Next, the robot controller unit 920 will be described.

Based on the pieces of information obtained by the prediction unit 914 and the gripping instruction unit 916, the robot work instruction unit 921 generates an instruction signal for moving the hand. For example, the robot work instruction unit 921 generates an instruction signal to move the hand to perform predetermined work (for example, assembly work) in accordance with an instruction from the prediction unit 914. Also, the robot work instruction unit 921 generates an instruction signal to move the hand to grip a target object to be gripped next in accordance with an instruction from the gripping instruction unit 916.

Note that the robot work operations are not limited to movement, gripping, suction, and assembly, and also include other work operations such as inspection of the appearance of the target object 903, as a matter of course. Furthermore, the robot is not limited to an articulated robot, and may be a movable machine capable of NC control.

Upon receiving an instruction signal from the robot work instruction unit 921, a robot control unit 922 controls the operation of the robot 900 in accordance with the instruction signal. The position and orientation of the hand of the robot 900 can therefore be moved in accordance with the instruction signal.

Figure 10:
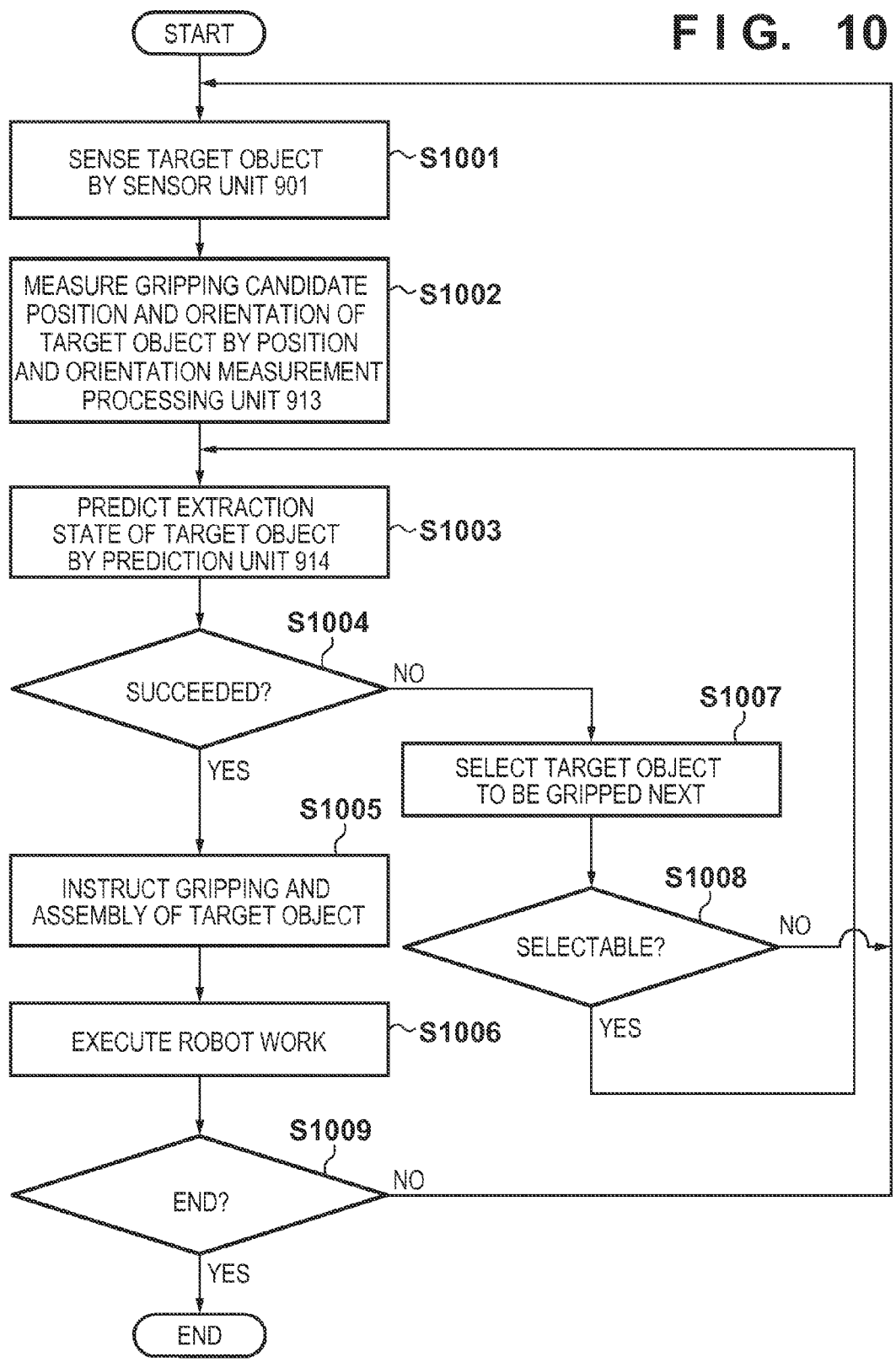
FIG. 10 is a flowchart showing the operation of the system.

The operation of the system according to the third embodiment will be described with reference to the flowchart of FIG. 10.

In step S1001, the sensor unit 901 fixed above the pallet 904 senses an image of the target objects 903, and outputs the sensed image to the sensor information acquisition unit 911. Assume that the position and orientation of the sensor unit 901 has been obtained in advance by calibration. The sensor information acquisition unit 911 sends, to the position and orientation measurement processing unit 913, the sensed image of the target objects 903 that has been received from the sensor unit 901.

In step S1002, the position and orientation measurement processing unit 913 obtains (measures) the position and orientation of at least one target object among a plurality of target objects in the sensed image received from the sensor information acquisition unit 911. The obtained position and orientation is used to predict whether extraction of a target object will succeed or to grip a target object by the robot. The processing in step S1002 is the same as that in step S402, and a description thereof will not be repeated.

After obtaining the position and orientation of the gripping candidate object, the position and orientation measurement processing unit 913 sends the obtained position and orientation to the prediction unit 914 and the target object selection unit 915. If the position and orientation measurement processing unit 913 obtains the positions and orientations of a plurality of gripping candidate objects, it sends all the obtained positions and orientations to the prediction unit 914 and the target object selection unit 915.

In step S1003, if the prediction unit 914 receives the positions and orientations of a plurality of gripping candidate objects from the position and orientation measurement processing unit 913, it selects the position and orientation of one gripping candidate object from them. For example, the prediction unit 914 selects a gripping candidate object at the top (a gripping candidate object having, of position components, a largest coordinate component in the direction of normal to the surface on which the pallet 904 is placed) that is highly likely to be able to be picked from the heap. When the prediction unit 914 receives the position and orientation of one target object from the position and orientation measurement processing unit 913, it selects the position and orientation of the target object.

Based on the position and orientation of the selected target object, the prediction unit 914 predicts an extraction state representing whether the robot 900 will succeed in extraction. The range of positions, orientations, or both of them of target objects in which extraction by the robot 900 is highly likely to succeed is held as successful extraction range information in a memory unit (not shown) in the image processing unit 910. This range may be set and determined by operating a user interface unit (not shown) by the user, or be determined from a work history of past extraction by the robot and the like. The extraction state is predicted based on whether the position and orientation of the selected target object falls within the successful extraction range. If the position and orientation of the selected target object falls within the successful extraction range, the prediction unit 914 predicts that extraction will succeed; otherwise, it predicts that extraction will fail. Alternatively, the range of positions, orientations, or both of them of target objects in which extraction is highly likely to fail may be held as failure extraction range information in advance. In this case, if the position and orientation of the selected target object falls within the failure extraction range, the prediction unit 914 predicts that extraction will fail.

The prediction unit 914 registers, in a prediction list managed in the memory unit (not shown) in the image processing unit 910, a target object whose extraction state has been predicted. Information to be registered is not limited to specific information, and may be a position and orientation, information representing a position or area on a sensed image, or identification information assigned on a sensed image.

If the prediction unit 914 predicts that the extraction will succeed, the process advances to step S1005. If the prediction unit 914 predicts that the extraction will fail, the process advances to step S1007.

In step S1005, the prediction unit 914 instructs the robot work instruction unit 921 to control the robot 900 to perform predetermined work (for example, assembly work).

In step S1006, the robot work instruction unit 921 instructs the robot control unit 922 to execute the contents of the instruction received in step S1005. The robot control unit 922 controls the robot 900 in accordance with the instruction signal from the robot work instruction unit 921, moves the hand to the position and orientation indicated by the instruction signal, and controls it to perform the predetermined work (for example, assembly work).

In step S1007, to select a target object to be gripped next, the prediction unit 914 outputs, to the target object selection unit 915, prediction information representing that the extraction will fail. The target object selection unit 915 selects a target object to be gripped next by using the prediction information output from the prediction unit 914, the position and orientation of the gripping candidate object output from the position and orientation measurement processing unit 913, and the prediction list registered in the memory unit (not shown).

In the third embodiment, a target object at a position closest to the target object predicted to fail in extraction is selected as a next gripping candidate among target objects (gripping candidate objects) whose positions and orientations have been measured in step S1002, excluding target objects registered in the prediction list. Gripping the closest target object as the gripping candidate by the robot 900 can positively change the position and orientation of the target object predicted to fail in extraction.

The closeness of target objects can be determined by comparing model barycentric positions obtained upon measuring the positions and orientations of target objects. The comparison is executed after converting the model barycentric positions from a local coordinate system defining the positions and orientations of target objects into the work space coordinate system.

In step S1008, the target object selection unit 915 determines whether a target object to be gripped next has been selected in step S1007. For example, if the position and orientation of even one target object has not been measured except for a target object predicted to fail in extraction, a target object to be gripped next cannot be selected. As a matter of course, when a target object matching the selection condition is not detected in step S1007, a target object to be gripped next cannot be selected. These situations can be determined by referring to the position and orientation measurement result in step S1002 and the prediction list.

If a target object to be gripped next can be selected, the target object selection unit 915 outputs, to the gripping instruction unit 916, the position and orientation selected as those of the gripping candidate out of the positions and orientations obtained in step S1002. The process then returns to step S1003.

If a target object to be gripped next cannot be selected, the target object selection unit 915 outputs, to a mechanism (not shown) for swinging the pallet 904, an instruction to swing the pallet 904. After that, the process returns to step S1001. Also, the target object selection unit 915 initializes the prediction list.

In step S1009, it is determined whether an end instruction has been received. If no end instruction has been received, the registration list is initialized and the process returns to step S1001. If an end instruction has been received, the sequence ends to stop all the operations. Note that the user may press an emergency stop button (not shown) to end the sequence and stop all the operations without waiting for the end determination in step S1009.

As described above, according to the third embodiment, the position and orientation of a target object is measured using a fixed sensor, and the state of extraction by the robot is predicted by comparing the position and orientation of the target object with successful extraction range information prepared in advance. If it is predicted that the extraction by the robot will fail, a target object at a closest position in a sensed image is selected as an interacting target object based on the positions and orientations of target objects in the pallet, and gripping is instructed. This can positively move the target object predicted to fail in extraction, and enables efficient work without decreasing the number of gripping target candidates. Since gripping of the next target object and movement of the target object predicted to fail in extraction are executed simultaneously, the tact time of the work process can be shortened. Since the target object predicted to fail in extraction is not gripped, the tact time of the work process can be shortened.

<Modification>

In the third embodiment, a target object at a closest position in a sensed image is selected as a next gripping candidate based on the positions and orientations of target objects in the pallet. As a modification to the third embodiment, a target object overlapping one predicted to fail in extraction can be selected as a next gripping candidate. When models obtained upon measuring the positions and orientations of target objects in step S1002 are projected and arranged onto a sensed image, as shown in FIG. 8A, and the outer shapes interfere with each other, it may be determined that the target objects overlap each other. Alternatively, when bounding boxes each surrounding a target object are arranged on a sensed image based on the positions and orientations of target objects, as shown in FIG. 8B, and they interfere with each other, it may be determined that the target objects overlap each other. Note that interference between two areas can be determined by a known technique, and a description thereof will be omitted here.

As described above, in the modification to the third embodiment, a target object overlapping one predicted to fail in extraction is selected as a next gripping target, so the target object predicted to fail in extraction can be reliably moved.

Fourth Embodiment

In the fourth embodiment, when it is predicted that extraction by a robot will fail, an interacting target object in the three-dimensional space is selected based on the positions and orientations of target objects in a pallet. The fourth embodiment is different from the third embodiment in only the operation of a target object selection unit 915 (step S1007). Therefore, the operation of the target object selection unit 915 in the fourth embodiment will be explained below, and the remaining part is the same as that in the third embodiment, unless otherwise specified.

The target object selection unit 915 receives, from a prediction unit 914, prediction information representing that extraction by a robot 900 will fail, and further receives a position and orientation output from a position and orientation measurement processing unit 913. Upon receiving these pieces of information, the target object selection unit 915 selects a target object to be gripped next by the robot 900. The target object selection unit 915 outputs, to a gripping instruction unit 916, the position and orientation information of the target object to be gripped next.

In step S1007, to select a target object to be gripped next, the prediction unit 914 outputs, to the target object selection unit 915, prediction information representing that the extraction will fail. The target object selection unit 915 selects a target object to be gripped next by using the prediction information output from the prediction unit 914, the position and orientation of the target object output from the position and orientation measurement processing unit 913, and the prediction list.

A method of selecting a target object to be gripped next will be explained. In the fourth embodiment, a target object present at a deep position in the three-dimensional space from a target object predicted to fail in extraction when viewed from a sensor unit 901 is selected as a target object to be gripped next among target objects whose positions and orientations have been measured in step S1002, excluding target objects registered in the prediction list. "A deep position in the three-dimensional space from a target object predicted to fail in extraction when viewed from the sensor unit 901" means "a position having a distance longer than a distance from the sensor unit 901 to a target object predicted to fail in extraction".

Gripping a target object below one predicted to fail in extraction by the robot 900 can positively change the position and orientation of the upper target object predicted to fail in extraction. Note that the target object below one predicted to fail in extraction includes a target object which exists below the target object predicted to fail in extraction so as to overlap each other, and a target object which may interact with the target object predicted to fail in extraction via another target object even if these target objects are spaced apart from each other in an image sensed by the sensor unit 901. A position in the three-dimensional space is a model barycentric position obtained when the position and orientation of a target object is measured. The model barycentric position is converted from a local coordinate system defining the positions and orientations of target objects into the work space coordinate system.

A target object may be simply selected based on the distance from the sensor unit 901. It is also possible to divide the area of heaped target objects in the pallet into respective heaps, and select, as a target object to be gripped next, a target object which exists at a deep position in the same heap as that of a target object predicted to fail in extraction. This technique has already been described in the second embodiment, and a description thereof will not be repeated.

As described above, according to the fourth embodiment, when it is predicted that extraction by the robot will fail, a target object at a deep position in the three-dimensional space from a target object predicted to fail in extraction when viewed from the sensor unit 901 is selected based on the positions and orientations of target objects in the pallet, and gripping is instructed. This can positively move the target object predicted to fail in extraction, and enables efficient work without decreasing the number of gripping target candidates. Since gripping of the next target object and movement of the target object predicted to fail in extraction are executed simultaneously, the tact time of the work process can be shortened. Since a target object below one predicted to fail in extraction is selected as a next gripping target, the heap can be changed to reliably move the target object predicted to fail in extraction.

<Modification>

In the fourth embodiment, a target object below one predicted to fail in extraction is selected as a next gripping candidate based on the positions and orientations of target objects in the pallet. As a modification to the fourth embodiment, a target object three-dimensionally interfering with a target object predicted to fail in extraction can be selected as a next gripping candidate. When models obtained upon measuring the positions and orientations of target objects in step S1002 are arranged in the three-dimensional space, and the model surfaces interfere with each other or exist at very close positions (for example, within 1 mm), it may be determined that the target objects interfere with each other. Alternatively, when bounding boxes each surrounding a target object are arranged in the three-dimensional space based on the positions and orientations of target objects, and they interfere with each other, it may be determined that the target objects interfere with each other. Interference between two spaces can be determined by a known technique, and a description thereof will be omitted here.

As described above, in the modification to the fourth embodiment, a target object interfering with one predicted to fail in extraction is selected as a next gripping target, so the target object predicted to fail in extraction can be reliably moved.

Note that the third and fourth embodiments and their modifications are merely examples of the following arrangement, and can be arbitrarily modified and changed as long as the arrangement complies with the following arrangement. More specifically, the positions and orientations of one or more target objects are obtained from the result of measuring a set of target objects by using the sensor. Then, whether the grip unit of a robot will succeed in gripping the target object is predicted based on a result obtained for one of the target objects. If it is predicted that the gripping will fail, one of the target objects that interacts with the target object predicted to fail in extraction is selected, and the robot is controlled to grip the selected target object by the grip unit.

Fifth Embodiment

In the first and second embodiments, the position and orientation of a target object is measured using a fixed sensor unit, and the extraction state of the target object is measured using a sensor unit mounted on a robot. As a modification to this, the position and orientation of a target object may be measured using the sensor unit mounted on the robot, and the extraction state of the target object may be measured using the fixed sensor unit.

The position and orientation of a target object is measured using a fixed sensor unit in the third and fourth embodiments, but may be measured using a sensor unit mounted on a robot.

In the first to fourth embodiments, the position and orientation measurement processing unit 113 (913) measures the position and orientation of a target object. Instead, only the position may be measured to select a close target object or a lower target object.

The sensor unit 101 (901) is fixed above the pallet 104 (904) in the first to fourth embodiments, but may be arranged in a position and orientation inclined to or beside the pallet 104 (904). In the second and fourth embodiments, to select, as a target object to be gripped next, a target object below one failed in extraction or predicted to fail in extraction, a target object at a deep position when viewed from the sensor unit 101 (901) is selected. When the sensor unit 101 (901) is arranged in a position and orientation inclined to or beside the pallet 104 (904), a target object below one failed in extraction or predicted to fail in extraction is selected by performing geometric transform from an arrangement in the three-dimensional space.

The extraction state is measured using the sensor unit mounted on the robot in the first and second embodiments, but may be measured using a robot control parameter. For example, if it is determined that a control parameter such as the gripping angle (or torque or suction pressure) used when the robot hand extracts a target object is different from a predetermined robot control parameter, it is determined that the extraction has failed, a target object to be gripped next is selected, and gripping is instructed.

Sensor units 101 and 102 may be formed from a single sensor unit. More specifically, the sensor unit 102 mounted on the robot also functions as the sensor unit 101. First, the sensor unit 102 is arranged above a pallet 104 by a robot 100 and measures the positions and orientations of target objects in the pallet. After the robot 100 grips a target object, the sensor unit 102 measures the extraction state of the gripped target object. If it is determined that the gripping has failed, a target object to be gripped next is selected based on the positions and orientations of target objects measured using the sensor unit 102, and gripping is instructed.

Also, the sensor units 101 and 102 and a sensor unit 901 may be sensor units (range image sensors or three-dimensional point group measurement sensors) for acquiring three-dimensional information (a range image or three-dimensional point group data) about target objects. The sensor unit for acquiring a range image can be, for example, a range image sensor formed from a projector and camera, or a TOF range image sensor for measuring the depth to each pixel based on the light propagation time. The three-dimensional information may be not image-like distance data aligned in a two-dimensional array, but three-dimensional point group data measured as a group of sparse points. The three-dimensional information such as a range image or three-dimensional point group data may be acquired by scanning a one-dimensional line sensor.

Position and orientation measurement using a model held by a model information holding unit 112 has been described above. However, the sensor units 101, 102, and 901 may be formed from stereo cameras, and the position and orientation of a target object may be measured by stereo measurement.

Although the robot is used to perform work for a target object in the above description, the present invention is not limited to the use of the robot. For example, a mechanism may be formed from a combination of a linear stage and rotation stage, and the position and orientation may be changed by controlling the stages.

The image processing unit 110 (910) shown in FIGS. 1 and 9 may be formed from a general PC (Personal Computer). For example, the model information holding unit 112 (912) is formed from a hard disk device. The hard disk device stores computer programs and data for causing the CPU of the PC to execute the functions of the respective units other than the model information holding unit 112 (912) in the image processing unit 110 (910). The CPU can load the computer programs and data stored in the hard disk device into a memory such as a RAM, as needed, and execute processing using the computer programs and data. As a result, the PC can implement the functions of the image processing unit 110 (910).

Effects of Embodiments

In the first embodiment, the position and orientation of a target object is measured using a fixed sensor, and the state of extraction by the robot is measured using a sensor mounted on the robot. If it is determined that the extraction by the robot has failed, a target object at a closest position in a two-dimensional image is selected as an interacting target object based on the positions and orientations of target objects in the pallet, and gripping is instructed. This can positively move the target object failed in extraction, and enables efficient work without decreasing the number of gripping target candidates. Since gripping of the next target object and movement of the target object failed in extraction are executed simultaneously, the tact time of the work process can be shortened.

In the modification to the first embodiment, a target object overlapping one failed in extraction is selected as a next gripping target, so the target object failed in extraction can be reliably moved.

In the second embodiment, when it is determined that extraction by the robot has failed, a target object at a deep position in the three-dimensional space from a target object failed in extraction when viewed from the sensor unit 101 is selected based on the positions and orientations of target objects in the pallet, and gripping is instructed. This can positively move the target object failed in extraction, and enables efficient work without decreasing the number of gripping target candidates. Since gripping of the next target object and movement of the target object failed in extraction are executed simultaneously, the tact time of the work process can be shortened. Since a target object below one failed in extraction is selected as a next gripping target, the heap can be changed to reliably move the target object failed in extraction.

In the modification to the second embodiment, a target object interfering with or close to a target object failed in extraction is selected as a next gripping target, so the target object failed in extraction can be reliably moved.

In the third embodiment, the position and orientation of a target object is measured using a fixed sensor, and the state of extraction by the robot is predicted by comparing the position and orientation of the target object with successful extraction range information prepared in advance. If it is predicted that the extraction by the robot will fail, a target object at a closest position in a two-dimensional image is selected as an interacting target object based on the positions and orientations of target objects in the pallet, and gripping is instructed. This can positively move the target object predicted to fail in extraction, and enables efficient work without decreasing the number of gripping target candidates. Since gripping of the next target object and movement of the target object predicted to fail in extraction are executed simultaneously, the tact time of the work process can be shortened. Since the target object predicted to fail in extraction is not gripped, the tact time of the work process can be shortened.

In the modification to the third embodiment, a target object overlapping one predicted to fail in extraction is selected as a next gripping target, so the target object predicted to fail in extraction can be reliably moved.

In the fourth embodiment, when it is predicted that extraction by the robot will fail, a target object at a deep position in the three-dimensional space from a target object predicted to fail in extraction when viewed from the sensor unit 901 is selected based on the positions and orientations of target objects in the pallet, and gripping is instructed. This can positively move the target object predicted to fail in extraction, and enables efficient work without decreasing the number of gripping target candidates. Since gripping of the next target object and movement of the target object predicted to fail in extraction are executed simultaneously, the tact time of the work process can be shortened. Since a target object below one predicted to fail in extraction is selected as a next gripping target, the heap can be changed to reliably move the target object predicted to fail in extraction. Since the target object predicted to fail in extraction is not gripped, the tact time of the work process can be shortened.

In the modification to the fourth embodiment, a target object interacting with or close to a target object predicted to fail in extraction is selected as a next gripping target, so the target object predicted to fail in extraction can be reliably moved.

DEFINITIONS

The "extraction state" is arbitrary as long as it represents a state in which the robot has extracted a target object or a state in which it will extract a target object. Examples of the extraction state may be information representing whether gripping of a target object has succeeded in the first and second embodiments, and information representing whether gripping of a target object will succeed in the third and fourth embodiments.

The "interacting target object" is arbitrary as long as it can move a target object failed in extraction or a target object predicted to fail in extraction. Examples of the interacting target object may be a target object at a close position in the first and third embodiments, and an overlapping target object in the modifications to the first and third embodiments. Also, examples may be a target object at a deep position, that is, a lower position when viewed from the first sensor in the second and fourth embodiments, and an interfering or close target object in the modifications to the second and fourth embodiments.

The "first sensor" is arbitrary as long as it measures the position and orientation of a target object in the pallet. Examples of the first sensor may be a fixed sensor in the first and second embodiments, or a sensor mounted on the robot in the remaining embodiments.

The "second sensor" is arbitrary as long as it measures the state of extraction of a target object by the robot. Examples of the second sensor may be a sensor mounted on the robot in the first embodiment, and a fixed sensor in the remaining embodiments. As described above, the extraction state may be measured using the control parameter of the robot.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-053687 filed Mar. 9, 2012 which is hereby incorporated by reference herein in its entirety.

What is claimed is:

1. An information processing apparatus comprising:
a calculation unit configured to calculate a position and orientation of at least one target object from a result of measuring a set of target objects by using a first sensor;
a control unit configured to control a robot including a holding unit to hold, as a first holding target object, one target object among the at least one target object by the holding unit;
a determination unit configured to determine whether the holding unit has succeeded in holding the first holding target object, from a result of measurement performed by a second sensor for measuring the first holding target object held by the holding unit; and
a selection unit configured to select, when the holding unit has been determined to fail in holding the first holding target object, a second holding target object having a positional relationship with the first holding target object, wherein a holding operation by the holding unit of the second holding target object having the positional relationship with the first holding target object causes changing the position and orientation of the first holding target object,
wherein said control unit controls the robot to hold, by the holding unit, the second holding target object selected by said selection unit.

2. The apparatus according to claim 1, wherein said calculation unit calculates a position and orientation of the at least one target object by using the set that has been sensed by the first sensor.

3. The apparatus according to claim 1, wherein said determination unit performs calculation for calculating a position and orientation of the first holding target object by using a sensed image sensed by the second sensor, and when the calculation fails, determines that the holding unit has failed in holding the first holding target object.

4. The apparatus according to claim 1, wherein said selection unit selects the second holding target object which has not been selected yet from the at least one target object, and is at a position near the first holding target object.

5. The apparatus according to claim 1, wherein said selection unit selects the second holding target object which has not been selected yet from the at least one target object, and is overlapping with the first holding target object.

6. The apparatus according to claim 1, wherein said selection unit selects the second holding target object which has not been selected yet from the at least one target object, and has a distance from the first sensor larger than a distance from the first sensor to the first holding target object.

7. The apparatus according to claim 1, wherein said selection unit selects the second holding target object which has not been selected yet from the at least one target object, and is close to the first holding target object.

8. The apparatus according to claim 1, further comprising:
the robot;
the first sensor; and
the second sensor.

9. An information processing apparatus comprising:
a calculation unit configured to calculate a position and orientation of at least one target object from a result of measuring a set of target objects by using a sensor;
a prediction unit configured to predict, based on a result calculated by said calculation unit for a first holding target object among the at least one target object, whether a holding unit of a robot will succeed in holding the first holding target object;

a selection unit configured to select, when said prediction unit predicts that the holding unit will fail in holding the first holding target object, a second holding target object having a positional relationship with the first holding target object, wherein a holding operation by the holding unit of the second holding target object having the positional relationship with the first holding target object causes changing the position and orientation of the first holding target object; and a control unit configured to control the robot to hold, by the holding unit, the second holding target object selected by said selection unit.

10. The apparatus according to claim 9, wherein said prediction unit predicts whether the holding unit of the robot will succeed in holding the first holding target object by comparing a position and orientation of the first holding target object with a predetermined range of positions and orientations.

11. The apparatus according to claim 9, further comprising:
the robot; and
the sensor.

12. An information processing method comprising:
a calculation step of calculating a position and orientation of at least one target object from a result of measuring a set of target objects by using a first sensor;
a control step of controlling a robot including a holding unit to hold, as a first holding target object, one target object among the at least one target object by the holding unit;
a determination step of determining whether the holding unit has succeeded in holding the first holding target object, from a result of measurement performed by a second sensor for measuring the first holding target object held by the holding unit; and
a selection step of, when the holding unit has been determined to fail in holding the first holding target object, selecting a second holding target object having a positional relationship with the first holding target object, wherein a holding operation by the holding unit of the second holding target object having the positional relationship with the first holding target object causes changing the position and orientation of the first holding target object,
wherein in the control step, the robot is controlled to hold, by the holding unit, the second holding target object selected in the selection step.

13. An information processing method comprising:
a calculation step of calculating a position and orientation of at least one target object from a result of measuring a set of target objects by using a sensor;
a prediction step of predicting, based on a result calculated in the calculation step for a first holding target object among the at least one target object, whether a holding unit of a robot will succeed in holding the first holding target object;
a selection step of, when the holding unit is predicted in the prediction step to fail in holding the first holding target object, selecting a second holding target object having a positional relationship with the first holding target object, wherein a holding operation by the holding unit of the second holding target object having the positional relationship with the first holding target object causes changing the position and orientation of the first holding target object; and
a control step of controlling the robot to hold, by the holding unit, the second holding target object selected in the selection step.

14. A non-transitory computer-readable storage medium storing a computer program for causing a computer to function as each unit of an information processing apparatus defined in claim 1.

15. A non-transitory computer-readable storage medium storing a computer program for causing a computer to function as each unit of an information processing apparatus defined in claim 9.

* * * * *